United States Patent
Lee et al.

(10) Patent No.: US 10,454,292 B2
(45) Date of Patent: Oct. 22, 2019

(54) ELECTRONIC DEVICE AND OPERATION METHOD THEREOF

(71) Applicant: Samsung Electronics Co., Ltd., Gyeonggi-do (KR)

(72) Inventors: Myungkee Lee, Gyeonggi-do (KR); Seungchul Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 13 days.

(21) Appl. No.: 15/811,831

(22) Filed: Nov. 14, 2017

(65) Prior Publication Data

US 2018/0145530 A1 May 24, 2018

(30) Foreign Application Priority Data

Nov. 24, 2016 (KR) .................. 10-2016-0157235

(51) Int. Cl.
*H02J 7/00* (2006.01)

(52) U.S. Cl.
CPC .......... *H02J 7/0068* (2013.01); *H02J 7/0004* (2013.01); *H02J 7/0029* (2013.01); *H02J 7/0047* (2013.01); *H02J 7/0054* (2013.01); *H02J 2007/0039* (2013.01); *H02J 2007/0096* (2013.01); *Y02B 40/90* (2013.01)

(58) Field of Classification Search
CPC ....... Y02E 60/12; H02J 7/0054; H02J 7/1423; H01M 10/44; H01M 10/46
USPC ........................................................ 320/103
See application file for complete search history.

(56) References Cited

U.S. PATENT DOCUMENTS

| 5,432,427 A * | 7/1995 | Chiang | H02J 7/0031 320/136 |
| 2006/0063044 A1* | 3/2006 | DeVries | H01M 2/1005 429/9 |
| 2008/0169705 A1* | 7/2008 | Tan | H01M 10/44 307/66 |

(Continued)

FOREIGN PATENT DOCUMENTS

| EP | 2 725 680 A1 | 4/2014 |
| KR | 10-2016-0037511 A | 4/2016 |
| WO | 2015/113344 A1 | 8/2015 |

OTHER PUBLICATIONS

European Search Report dated Feb. 8, 2018.
European Search Report dated Dec. 14, 2018.

*Primary Examiner* — Arun C Williams
(74) *Attorney, Agent, or Firm* — Cha & Reiter, LLC.

(57) ABSTRACT

Disclosed is an electronic device and an operation method thereof. The electronic device includes a housing, a battery disposed in the housing, at least one internal device disposed in the housing, a switch connectable to the at least one internal device to supply power received from an external power supply to the at least one internal device. The controller implements the method, including in response to detecting a connection to the external power supply, utilizing power of a first voltage received from the external power supply as operating power of the at least one internal device, and transmitting at least a part of the operating power to the battery to charge the battery, and wherein the received power of the first voltage is supplied to the at least one internal device without step-down.

20 Claims, 18 Drawing Sheets

(56) References Cited

U.S. PATENT DOCUMENTS

2008/0246438 A1* 10/2008 Lu .......................... H02J 7/027
                                                         320/137
2014/0300310 A1   10/2014  Caren
2016/0094058 A1    3/2016  Han
2017/0005499 A1    1/2017  Zhang et al.

* cited by examiner

ELECTRONIC DEVICE AND OPERATION METHOD THEREOF

CLAIM OF PRIORITY

This application claims the priority under 35 U.S.C. § 119(a) to Korean Patent Application Serial No. 10-2016-0157235, which was filed in the Korean Intellectual Property Office on Nov. 24, 2016, the entire content of which is hereby incorporated by reference.

TECHNICAL FIELD

The present disclosure relates to an electronic device for charging a battery using an external power supply device, and an operation method of an electronic device.

BACKGROUND

Recently, with the development of digital technologies, various electronic devices including mobile communication electronic devices, Personal Digital Assistants (PDA), electronic organizers, smart phones, tablet Personal Computers (PC), and the like which can perform communication and process personal information while being carried have come to market. The electronic device is provided for purpose of portability, and thus, a battery is used as a power supply unit.

Generally, the battery of an electronic device can be charged through an external power supply. For example, a user may charge the battery of the electronic device using a power bank or a supplementary battery.

SUMMARY

An electronic device may charge a battery using charging power provided from an external power supply. For example, the external power supply may supply power to the electronic device by stepping up a voltage to a predetermined level, and the electronic device may charge the battery by stepping down the stepped-up power to power of a predetermined level voltage. However, due to the step up operation by the external power supply and the stepdown operation by the electronic device, battery charging efficiency may decrease below a predetermined level.

Various embodiments of the present disclosure may provide an electronic device and a method for improving battery charging efficiency.

In one embodiment of the disclosure, an electronic device is disclosed, including a housing, a battery disposed in the housing, at least one internal device disposed in the housing, a switch connectable to the at least one internal device to supply power received from an external power supply to the at least one internal device, and a controller executing in response to detecting a connection to the external power supply, utilizing power of a first voltage received from the external power supply as operating power of the at least one internal device, and transmit at least a part of the operating power to the battery to charge the battery, and wherein the received power of the first voltage is supplied to the at least one internal device without step-down.

In one embodiment of the disclosure, a method in an electronic device is disclosed, including in response to detecting connection with an external power supply, utilizing power of a first voltage received from an external power supply as operating power of at least one internal device, and transmitting at least a part of the operating power to a battery of the electronic device to charge the battery, wherein the received power of the first voltage is supplied to the at least one internal device without step-down.

In one embodiment of the disclosure, an external power supply is disclosed, including a battery configured to output power of a first voltage, a power converter configured to step up a voltage of the battery to a second voltage, a communication unit configured to communicate with an electronic device, and a controller configured to: receive information indicating a charging voltage supported by the electronic device, and transmit power to the electronic device according to the first voltage or the second voltage based on the received information.

An external power supply according to various embodiments of the present disclosure may include: a battery configured to output power of a first voltage; a power converting unit configured to step up a voltage of the battery to a second voltage; a communication unit configured to communicate with an electronic device; and a controller configured to receive information associated with a voltage of charging power supported by the electronic device, and to supply the power of the first voltage or the power of the second voltage to the electronic device based on the received information.

An electronic device and a method according to various embodiments of the present disclosure may receive, from an external battery, power that is not stepped up so as to operate an internal device, and may charge a battery using a part of operating power, whereby battery charging efficiency may be improved.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
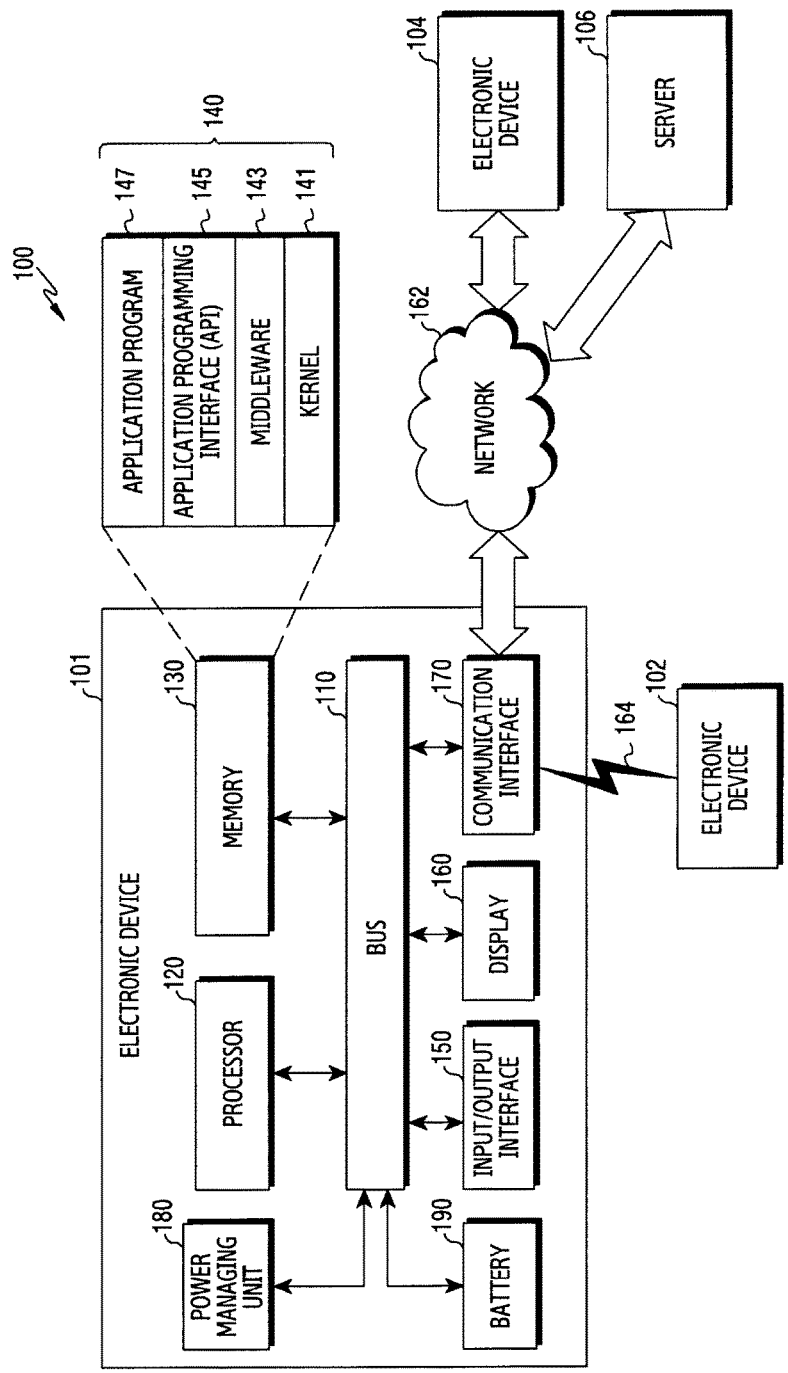
FIG. 1 is a diagram illustrating an electronic device within a network environment according to various embodiments.

Hereinafter, various embodiments of the present document are mentioned below with reference to the accompanying drawings. An embodiment and the terms used in this do not intend to limit the technology mentioned in the present document to a specific embodiment form, and should be construed as including various changes of the corresponding embodiment, equivalents thereof, and/or alternatives thereof. In the drawings, like reference symbols may denote like constituent elements. The expression of a singular form may include the expression of a plural form unless otherwise dictating clearly in context. In the present document, the expressions "A or B", "at least one of A and/or B", etc. may include all available combinations of words enumerated together. The expressions "1st", "2nd", "first", "second", etc. may modify corresponding constituent elements irrespective of order and/or importance, and are just used to distinguish one constituent element from another constituent element and do not limit the corresponding constituent elements. When it is mentioned that any (e.g., 1st) constituent element is "(operatively or communicatively) coupled with/to" or is "connected to" another (e.g., 2nd) constituent element, the any constituent element may be directly coupled to the another constituent element, or be coupled through a further constituent element (e.g., a third constituent element).

The expression "configured (or set) to ~" used in the present document may be used interchangeably with, for example, "suitable for ~", "having the capacity to ~", "designed to ~", "adapted to ~", "made to ~", or "capable of ~" in a hardware or software manner in accordance to circumstances. In any situation, the expression "device configured to ~" may represent that the device is "capable of ~" together with other devices or components. For example, the phrase "processor configured (or set) to perform A, B and C" may represent an exclusive processor (e.g., embedded processor) for performing a corresponding operation, or a generic-purpose processor (e.g., a central processing unit (CPU) or an application processor (AP)) capable of performing corresponding operations by executing one or more software programs stored in a memory device.

An electronic device according to various embodiments of the present document may, for example, include at least one of a smartphone, a tablet personal computer (PC), a mobile phone, a video phone, an electronic book reader, a desktop PC, a laptop PC, a netbook computer, a workstation, a server, a portable digital assistant (PDA), a portable multimedia player (PMP), an MPEG-1 audio layer-3 (MP3) player, a medical device, a camera or a wearable device. The wearable device may include at least one of an accessory type (e.g., a watch, a ring, a wristlet, an anklet, a necklace, glasses, a contact lens or a head-mounted-device (HMD)), a fabric or clothing integrated type (e.g., electronic clothes), a human-body mount type (e.g., a skin pad or tattoo) or a bio implantation type (e.g., an implantable circuit). According to certain embodiment, the electronic device may, for example, include at least one of a television (TV), a digital versatile disc (DVD) player, an audio system, a refrigerator, an air conditioner, a cleaner, an oven, a microwave, a washing machine, an air cleaner, a set-top box, a home automation control panel, a security control panel, a media box (for example, Samsung HomeSync™, Apple TV™ or Google TV™), a game console (e.g., Xbox™ or PlayStation™), an electronic dictionary, an electronic locking system, a camcorder or an electronic frame.

In another embodiment, the electronic device may include at least one of various medical devices (e.g., various portable medical measurement devices (e.g., a blood glucose sensor, a heat rate sensor, a blood pressure monitor, a body temperature meter, etc.), magnetic resonance angiography (MRA), magnetic resonance imaging (MRI), computed tomography (CT), a imaging equipment, an ultrasonic instrument, etc.)), a navigation device, a global navigation satellite system (GNSS), an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automatic teller's machine (ATM) of a financial institution, point of sales (POS) of shops, an internet of things (IoT) device (e.g., an electric bulb, various sensors, a sprinkler device, a fire alarm, a thermostat, a streetlight, a toaster, an exerciser, a hot water tank, a heater, a boiler, etc.).

According to certain embodiment, the electronic device may include at least one of a part of furniture, a building/structure or a car, an electronic board, an electronic signature receiving device, a projector or various metering devices (e.g., tap water, electricity, gas, radio wave metering devices or the like). In various embodiments, the electronic device may be flexible, or be a combination of two or more of the aforementioned various devices. The electronic device according to an embodiment of the present document is not limited to the aforementioned devices.

In the present document, the term 'user' may denote a person who uses the electronic device or a device (e.g., an artificial-intelligent electronic device) which uses the electronic device.

FIG. 1 is a diagram illustrating an electronic device within a network environment according to various embodiments.

Referring to FIG. 1, an electronic device 101 within a network environment 100 in various embodiments is described. The electronic device 101 may include a bus 110, a processor 120, a memory 130, an input output interface 150, a display 160, and a communication interface 170. In some embodiment, the electronic device 101 may omit at least one of the constituent elements or additionally have another constituent element.

The bus 110 may, for example, include a circuit coupling the constituent elements 110, 120, 150, 160 and 170 with one another and forwarding communication (e.g., a control message or data) between the constituent elements.

The processor 120 may include one or more of a central processing unit (CPU), an application processor (AP) or a communication processor (CP). The processor 120 may, for example, execute operation or data processing for control and/or communication of at least one another constituent element of the electronic device 101.

According to an embodiment, the processor 120 may perform processing such that an internal device of the electronic device 101 operates based on power supplied from an external power supply (e.g., an external battery). For example, the processor 120 may perform processing so as to receive power of a first voltage which is not stepped up by the external power supply, and to supply the power of the first voltage to the internal device. Also, the processor 120 may perform processing such that at least a part of operating power for the internal device is provided as charging power for charging the battery 190. For example, when it is determined that the battery voltage of the external power supply (e.g., an external battery voltage) is higher than the voltage of the electronic device 120 (e.g., an internal battery 190), the processor 120 may supply a part of the operating power as it is to the battery 190. As another example, when it is determined that the battery voltage of the external power supply is lower than the voltage of the battery 190 of the electronic device 101, the processor 120 may supply a part of operation power which is stepped up to a predetermined level, to the battery 190.

The memory 130 may include a volatile and/or non-volatile memory. The memory 130 may, for example, store a command or data related to at least one another constituent element of the electronic device 101. According to an embodiment, the memory 130 may store a software and/or program 140. The program 140 may, for example, include a kernel 141, a middleware 143, an application programming interface (API) 145, an application program (or "application") 147, and the like. At least some of the kernel 141, the middleware 143 or the API 145 may be called an operating system (OS).

The kernel 141 may, for example, control or manage system resources (e.g., bus 110, processor 120, memory 130, and the like) that are used for executing operations or functions implemented in other programs (e.g., middleware 143, API 145 or application program 147). Also, the kernel 141 may provide an interface through which the middleware 143, the API 145 or the application program 147 may control or manage the system resources of the electronic device 101 by accessing the individual constituent element of the electronic device 101.

The middleware 143 may, for example, perform a relay role of enabling the API 145 or the application program 147 to communicate and exchange data with the kernel 141. Also, the middleware 143 may process one or more work requests that are received from the application program 147, in accordance with priority. For example, the middleware 143 may grant priority capable of using the system resources (e.g., the bus 110, the processor 120, the memory 130 or the like) of the electronic device 101 to at least one of the application programs 147, and process one or more work requests.

The API 145 is, for example, an interface enabling the application program 147 to control a function provided by the kernel 141 or the middleware 143 and may, for example, include at least one interface or function (e.g., an instruction) for file control, window control, image processing, character control or the like.

The input output interface 150 may forward a command or data inputted from a user or another external device, to another constituent element(s) of the electronic device 101, or output a command or data received from the another constituent element(s) of the electronic device 101, to the user or another external device.

The display 160 may, for example, include a liquid crystal display (LCD), a light emitting diode (LED) display, an organic light emitting diode (OLED) display, a microelectromechanical systems (MEMS) display or an electronic paper display. The display 160 may, for example, display various contents (e.g., a text, an image, a video, an icon, a symbol and/or the like) to a user. The display 160 may include a touch screen. And, for example, the display 160 may receive a touch, gesture, proximity or hovering input that uses an electronic pen or a part of the user's body.

According to an embodiment, the display 160 may output summary information generated by the processor 120. According to another embodiment, the display 160 may output a playback screen of video data that is played back by adjusting a playback point in time by the processor 120.

The communication interface 170 may, for example, establish communication between the electronic device 101 and an external device (e.g., the first external electronic device 102, the second external electronic device 104 or the server 106). For example, the communication interface 170 may be coupled to a network 162 through wireless communication or wired communication, to communicate with the external device (e.g., the second external electronic device 104 or the server 106). Also, the communication interface 170 may enable short-range network communication 164 with the electronic device 102. The wireless communication may, for example, include a cellular communication that uses at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM) and the like. According to an embodiment, the wireless communication may, for example, include at least one of wireless fidelity (WiFi), Bluetooth (BT), Bluetooth low energy (BLE), Zigbee, near field communication (NFC), magnetic secure transmission (MST), radio frequency (RF) or body area network (BAN). According to an embodiment, the wireless communication may include GNSS. The GNSS may, for example, be a global positioning system (GPS), a global navigation satellite system (Glonass), Beidou navigation satellite system (hereinafter, "Beidou")) or Galileo, the European global satellite-based navigation system. Hereinafter, the "GPS" may be used interchangeably with the "GNSS". The wired communication may, for example, include at least one of a universal serial bus (USB), a high definition multimedia interface (HDMI), a recommended standard-232 (RS-232), power line communication (PLC), a plain old telephone service (POTS), and the like.

The network 162 may include at least one of a telecommunications network, for example, a computer network (e.g., local area network (LAN) or wide area network (WAN)), the Internet or a telephone network.

Each of the first and second electronic devices 102 and 104 may be a device of the same or different type from that of the electronic device 101. According to various embodiments, all or some of operations executed in the electronic device 101 may be executed in another one electronic device or a plurality of electronic devices (e.g., the electronic devices 102 and 104 or the server 106). According to an embodiment, in case where the electronic device 101 performs some function or service automatically or in response to a request, the electronic device 101 may, instead of or additionally to executing the function or service in itself, send a request for execution of at least a partial function associated with this to another device (e.g., electronic device 102, 104 or server 106). The another electronic device (e.g., electronic device 102, 104 or server 106) may execute the requested function or additional function, and forward the execution result to the electronic device 101. The electronic device 101 may process the received result as it is or additionally, to provide the requested function or service. For this, a cloud computing, distributed computing or client-server computing technology may be used, for example.

The power managing unit 180 may control charging the battery 190. According to an embodiment, the power managing unit 180 may include a power management integrated circuit (PMIC) and a charger integrated circuit (IC). For example, the power managing unit 180 may step up or step down power, which is supplied to the battery 190, to a predetermined level voltage.

Figure 2:
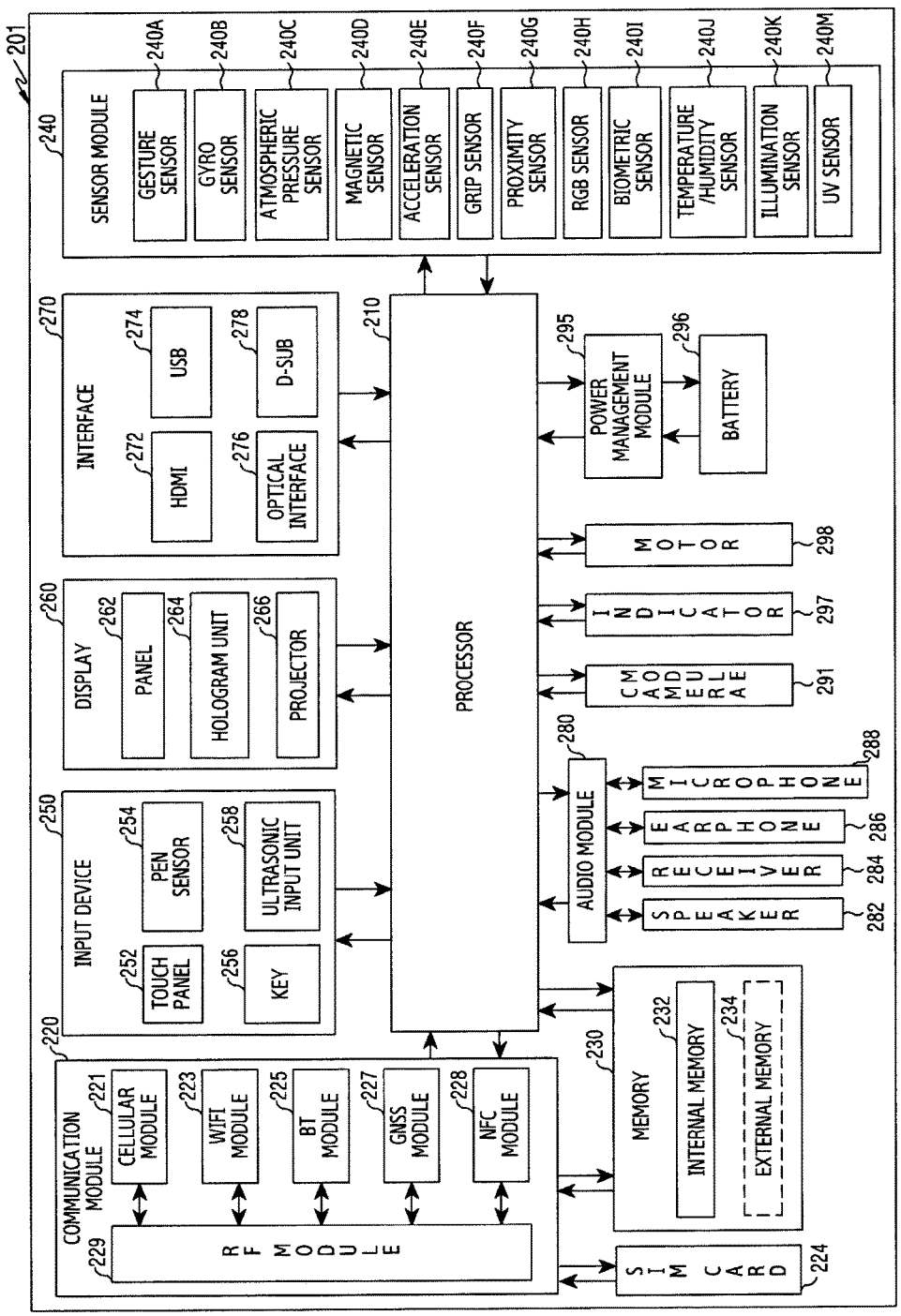
FIG. 2 is a block diagram illustrating an electronic device according to various embodiments of the present disclosure.

FIG. 2 is a block diagram illustrating an electronic device according to various embodiments of the present disclosure.

Referring to FIG. 2, an electronic device 201 may, for example, include the entire or part of the electronic device 101 illustrated in FIG. 1. The electronic device 201 may include one or more processors (e.g., application processor (APs)) 210, a communication module 220, a subscriber identification module 224, a memory 230, a sensor module 240, an input device 250, a display 260, an interface 270, an audio module 280, a camera module 291, a power management module 295, a battery 296, an indicator 297 and a motor 298.

The processor 210 may, for example, drive an operating system or an application program to control a majority of hardware or software constituent elements coupled to the processor 210, and may perform various data processing and operations. The processor 210 may be, for example, implemented as a system on chip (SoC). According to an embodiment, the processor 210 may further include a graphic processing unit (GPU) and/or an image signal processor (ISP). The processor 210 may include at least some (e.g., cellular module 221) of the constituent elements illustrated in FIG. 2 as well. The processor 210 may load a command or data received from at least one of the other constituent elements (e.g., non-volatile memory), to a volatile memory, to process the loaded command or data, and store the result data in the non-volatile memory.

The communication module 220 may, for example, have the same or similar construction with the communication interface 170. The communication module 220 may, for example, include a cellular module 221, a WiFi module 223, a Bluetooth module 225, a GNSS module 227, an near field communication (NFC) module 228, and a radio frequency (RF) module 229. The cellular module 221 may, for example, provide voice telephony, video telephony, a text service, an Internet service or the like through a telecommunication network. According to an embodiment, the cellular module 221 may perform the distinction and authentication of the electronic device 201 within the telecommunication network, by using the subscriber identification module (e.g., SIM card) 224. According to an embodiment, the cellular module 221 may perform at least some functions among functions that the processor 210 may provide. According to an embodiment, the cellular module 221 may include a communication processor (CP). According to some embodiment, at least some (e.g., two or more) of the cellular module 221, the WiFi module 223, the Bluetooth module 225, the GNSS module 227 or the NFC module 228 may be included within one integrated chip (IC) or IC package. The RF module 229 may, for example, transceive a communication signal (e.g., RF signal). The RF module 229 may, for example, include a transceiver, a power amplifier module (PAM), a frequency filter, a low noise amplifier (LNA), an antenna or the like. According to another embodiment, at least one of the cellular module 221, the WiFi module 223, the Bluetooth module 225, the GNSS module 227 or the NFC module 228 may transceive an RF signal through a separate RF module.

The subscriber identification module 224 may, for example, include a card including a subscriber identification module and/or an embedded SIM. And, the subscriber identification module 224 may include unique identification information (e.g., integrated circuit card identifier (ICCID)) or subscriber information (e.g., international mobile subscriber identity (IMSI)).

The memory 230 (e.g., memory 130) may, for example, include an internal memory 232 or an external memory 234. The internal memory 232 may, for example, include at least one of a volatile memory (e.g., a dynamic random access memory (DRAM), a static RAM (SRAM), a synchronous dynamic RAM (SDRAM) or the like) and a non-volatile memory (e.g., one time programmable read only memory (OTPROM), a programmable ROM (PROM), an erasable PROM (EPROM), an electrically EPROM (EEPROM), a mask ROM, a flash ROM, a flash memory, a hard drive or a solid state drive (SSD)). The external memory 234 may include a flash drive, for example, a compact flash (CF), a secure digital (SD), a micro-SD, a mini-SD, an extreme Digital (xD), a Multi Media Card (MMC), a memory stick or the like. The external memory 234 may be operatively or physically coupled with the electronic device 201 through various interfaces.

The sensor module 240 may, for example, measure a physical quantity or sense an activation state of the electronic device 201, to convert measured or sensed information into an electrical signal. The sensor module 240 may, for example, include at least one of a gesture sensor 240A, a gyro sensor 240B, a barometer or atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a medical sensor 240I, a temperature/humidity sensor 240J, an illuminance sensor 240K or an ultra violet (UV) sensor 240M. Additionally or alternatively, the sensor module 240 may, for example, include an E-nose sensor, an electromyography (EMG) sensor, an electroencephalogram (EEG) sensor, an electrocardiogram (ECG) sensor, an infrared (IR) sensor, an iris scan sensor and/or a finger scan sensor. The sensor module 240 may further include a control circuit for controlling at least one or more sensors belonging therein. In some embodiment, the electronic device 201 may further include a processor configured to control the sensor module 240 as a part of the processor 210 or separately, thereby controlling the sensor module 240 while the processor 210 is in a sleep state.

The input device 250 may, for example, include a touch panel 252, a (digital) pen sensor 254, a key 256 or an ultrasonic input device 258. The touch panel 252 may, for example, use at least one scheme among a capacitive overlay scheme, a pressure sensitive scheme, an infrared beam scheme or an ultrasonic scheme. Also, the touch panel 252 may further include a control circuit as well. The touch panel 252 may further include a tactile layer, to provide a tactile response to a user. The (digital) pen sensor 254 may, for example, be a part of the touch panel 252, or include a separate sheet for recognition. The key 256 may, for example, include a physical button, an optical key or a keypad. The ultrasonic input device 258 may sense an ultrasonic wave generated in an input tool, through a microphone (e.g., microphone 288), to confirm data corresponding to the sensed ultrasonic wave.

The display 260 (e.g., the display 160) may include a panel 262, a hologram device 264, a projector 266, and/or a control circuit for controlling them. The panel 262 may, for example, be implemented to be flexible, transparent, or wearable. The panel 262 may be constructed as one or more modules together with the touch panel 252. The hologram device 264 may show a three-dimensional image to the air using an interference of light. The projector 266 may project light onto a screen, to display an image. The screen may, for example, be located inside or outside the electronic device 201.

The interface 270 may, for example, include an HDMI 272, a USB 274, an optical interface 276 or a D-subminiature (D-sub) 278. The interface 270 may, for example, be included in the communication interface 170 illustrated in FIG. 1. Additionally or alternatively, the interface 270 may, for example, include a Mobile High-definition Link (MHL) interface, an SD card/Multi Media Card (MMC) interface or an Infrared Data Association (IrDA) standard interface.

The audio module 280 may, for example, convert a sound and an electrical signal interactively. At least some constituent elements of the audio module 280 may be, for example, included in the input output interface 150 illustrated in FIG. 1. The audio module 280 may for example, process sound information that is inputted or outputted through a speaker 282, a receiver 284, an earphone 286, the microphone 288 or the like.

The camera module 291 is, for example, a device able to photograph a still image and a video. According to an embodiment, the camera module 291 may include one or more image sensors (e.g., front sensor or rear sensor), a lens, an image signal processor (ISP) or a flash (e.g., an LED, a xenon lamp or the like).

The power management module 295 may, for example, manage the electric power of the electronic device 201. According to an embodiment, the power management module 295 may include a power management integrated circuit (PMIC), a charger IC or a battery or fuel gauge. The PMIC may, for example, employ a wired and/or wireless charging scheme. The wireless charging scheme may, for example, include a magnetic resonance scheme, a magnetic induction scheme, an electromagnetic wave scheme or the like. And, the wireless charging scheme may further include a supplementary circuit for wireless charging, for example, a coil loop, a resonance circuit, a rectifier or the like. The battery gauge may, for example, measure a level of the battery 296, a voltage being in charge, an electric current or a temperature. The battery 296 may, for example, include a rechargeable battery and/or a solar battery.

The indicator 297 may display a specific state, for example, a booting state, a message state, a charging state or the like of the electronic device 201 or a part (e.g., processor 210) of the electronic device 201.

The motor 298 may convert an electrical signal into a mechanical vibration, and may generate a vibration, a haptic effect or the like. The electronic device 201 may, for example, include a mobile TV support device (e.g., GPU) capable of processing media data according to the standards of digital multimedia broadcasting (DMB), digital video broadcasting (DVB), mediaFlo™ or the like. Each of the constituent elements described in the present document may consist of one or more components, and a name of the corresponding constituent element may be varied according to the kind of the electronic device. In various embodiments, the electronic device (e.g., electronic device 201) may omit some constituent elements, or further include additional constituent elements, or combine some of the constituent elements to configure one entity, but identically perform functions of corresponding constituent elements before combination.

Figure 3:
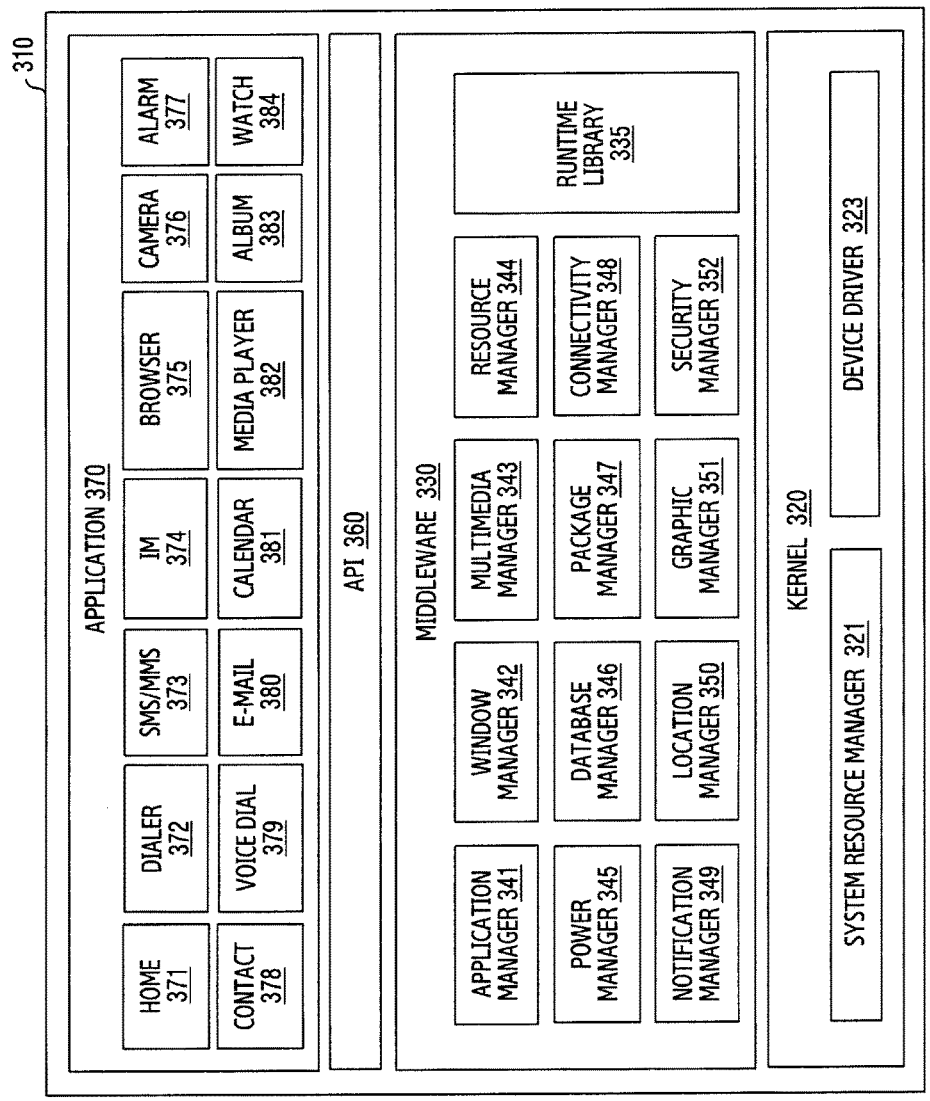
FIG. 3 is a block diagram illustrating a program module according to various embodiments of the present disclosure.

FIG. 3 is a block diagram illustrating a program module according to various embodiments of the present disclosure.

Referring to FIG. 3, a program module 310 (e.g., the program 140) may include an Operating System (OS) for controlling resources related to an electronic device (e.g., the electronic device 101) and/or various applications (e.g., the application program 147) driven on the operating system. The operating system may, for example, include Android™, iOS™, Windows™, Symbian™, Tizen™ or Bada™.

Referring to FIG. 3, the program module 310 may include a kernel 320 (e.g., the kernel 141), a middleware 330 (e.g., the middleware 143), an API 360 (e.g., the API 145), and/or an application 370 (e.g., the application program 147). At least a part of the program module 310 may be preloaded onto an electronic device, or be downloaded from an external electronic device (e.g., the electronic device 102, 104, the server 106, etc.).

The kernel 320 may, for example, include a system resource manager 321 and/or a device driver 323. The system resource manager 321 may perform control of a system resource, allocation thereof, recovery thereof or the like. According to an embodiment, the system resource manager 321 may include a process management unit, a memory management unit or a file system management unit. The device driver 323 may, for example, include a display driver, a camera driver, a Bluetooth driver, a shared memory driver, a USB driver, a keypad driver, a WiFi driver, an audio driver or an inter-process communication (IPC) driver.

The middleware 330 may, for example, provide a function that the application 370 commonly needs, or provide various functions to the application 370 through the API 360 so that the application 370 may make use of restricted system resources within an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351 or a security manager 352.

The runtime library 335 may, for example, include a library module that a compiler uses to add a new function through a programming language while the application 370 is executed. The runtime library 335 may perform input output management, memory management or arithmetic function processing. The application manager 341 may, for example, manage a lifecycle of the application 370. The window manager 342 may manage a graphic user interface (GUI) resource used by a screen. The multimedia manager 343 may detect a format required for playing media files, and perform encoding or decoding of the media file by using a codec suitable to the corresponding format. The resource manager 344 may manage a source code of the application 370 or a space of a memory. The power manager 345 may, for example, manage a battery capacity or a power supply, and provide power information required for an operation of an electronic device. According to an embodiment, the power manager 345 may interwork with a basic input/output system (BIOS). The database manager 346 may, for example, create, search or change a database that will be used by the application 370. The package manager 347 may manage installation or updating of an application that is distributed in a form of a package file. The connectivity manager 348 may, for example, manage wireless connectivity. The notification manager 349 may, for example, provide events such as an arrival message, an appointment, a proximity notification, etc. to a user. The location manager 350 may, for example, manage location information of an electronic device. The graphic manager 351 may, for example, manage a graphic effect that will be provided to a user, or a user interface related with this. The security manager 352 may, for example, provide system security or user authentication.

According to an embodiment, the middleware 330 may include a telephony manager for managing a voice or video telephony function of an electronic device, or a middleware module capable of forming a combination of functions of the aforementioned constituent elements. According to an embodiment, the middleware 330 may provide a module that is specialized based on the type of an operating system. The middleware 330 may dynamically delete some of the existing constituent elements or add new constituent elements. The API 360 is, for example, a set of API programming functions, and may be provided to have another construction in accordance with the operating system. For example, Android or iOS may provide one API set by platform, and Tizen may provide two or more API sets by platform.

The application 370 may, for example, include a home 371, a dialer 372, a short message service (SMS)/multimedia messaging service (MMS) 373, an instant message (IM) 374, a browser 375, a camera 376, an alarm 377, a contact 378, a voice dial 379, an electronic mail (e-mail) 380, a calendar 381, a media player 382, an album 383, a watch 384, health care (e.g., measuring a momentum, a blood sugar or the like), or an environment information (e.g., air pressure, humidity or temperature information) provision application. According to an embodiment, the application 370 may include an information exchange application that may support information exchange between an electronic device and an external electronic device. The information exchange application may, for example, include a notification relay application for relaying specific information to the external electronic device, or a device management application for managing the external electronic device. For example, the notification relay application may relay notification information generated by another application of an electronic device to an external electronic device, or receive notification information from the external electronic device to provide the received notification information to a user. The device management application may, for example, install, delete or update a function (e.g., turn-on/turn-off of the external electronic device itself (or some constituent components) or adjustment of a brightness (or resolution) of a display) of the external electronic device that communicates with the electronic device, or an application operating in the external electronic device. According to an embodiment, the application 370 may include an application (e.g., a health care application of a mobile medical instrument) designated according to an attribute of the external electronic device. According to an embodiment, the application 370 may include an application received from the external electronic device. At least a part of the program module 310 may be implemented (e.g., executed) by software, firmware, hardware (e.g., the processor 210) or a combination of at least two or more of them, and may include a module for performing one or more functions, a program, a routine, sets of instructions or a process.

The term "module" used in the present document may include a unit consisting of hardware, software or firmware and, for example, may be used interchangeably with the terms "logic", "logic block", "component", "circuit" or the like. The "module" may be an integrally configured component or the minimum unit performing one or more functions or a part thereof. The "module" may be implemented mechanically or electronically and, for example, may include an application-specific integrated circuit (ASIC) chip, field-programmable gate arrays (FPGAs) or a programmable logic device, which has been known or will be developed in future, performing some operations. At least a part of an apparatus (e.g., modules or functions thereof) or method (e.g., operations) according to various embodiments may, for example, be implemented by an instruction that is stored in a computer-readable storage media in the form of a program module. In case where the instruction is executed by a processor (e.g., the processor 120), the processor may perform a function corresponding to the instruction. The computer-readable recording media may include a hard disk, a floppy disk, a magnetic media (e.g., a magnetic tape), an optical recording media (e.g., a compact disc-read only memory (CD-ROM) or a DVD), a magneto-optical media (e.g., a floptical disk), an internal memory, etc. The instruction may include a code that is made by a compiler or a code that is executable by an interpreter. The module or program module according to various embodiments may include at least one or more of the aforementioned constituent elements, or omit some, or further include another constituent element. Operations carried out by the module, the program module or the another constituent element according to various embodiments may be executed in a sequential, parallel, repeated or heuristic manner, or at least some operations may be executed in different order or be omitted, or another operation may be added.

Figure 4A:
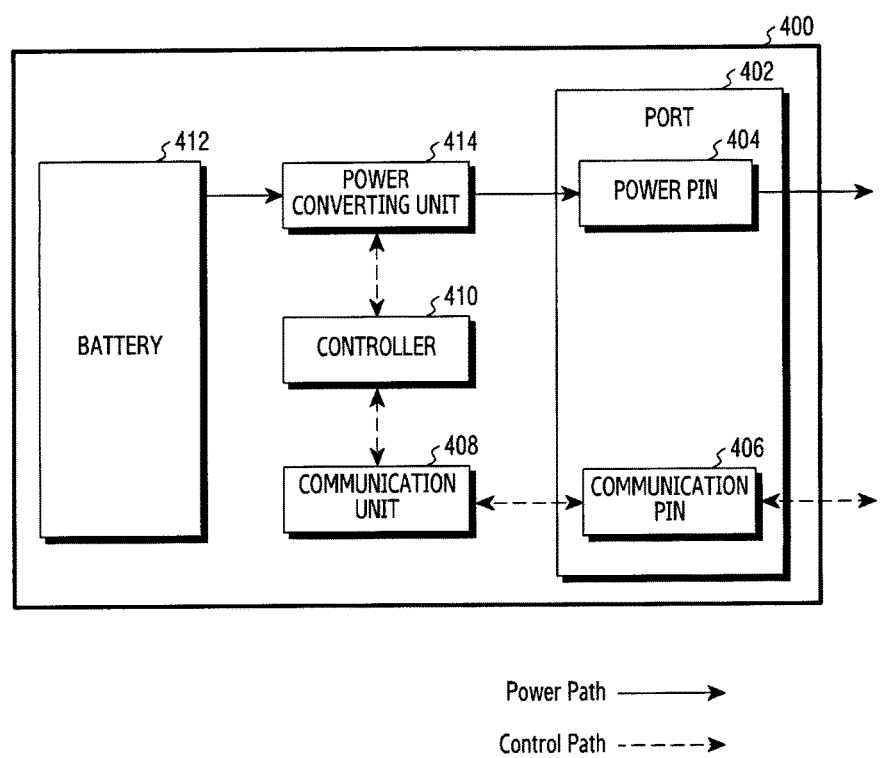
FIG. 4A is a diagram illustrating a configuration of an external power supply.

FIG. 4A is a diagram illustrating a configuration of an external power supply that supplies power to an electronic device according to various embodiments of the present disclosure. For example, the external power supply 400 may include a supplementary battery, and an electronic device that provides a supplementary battery function.

Referring to FIG. 4A, an external power supply 400 may include a port 402, a communication unit 408, a controller 410, a battery 412, and a power converting unit 414.

According to an embodiment, the port 402 may connect the external power supply 400 and an electronic device. For example, the port 402 may be provided in a structure with which the electronic device, a cable connected with the electronic device, or the like are capable of being connected. For example, the port 402 may include a universal serial bus (USB) port. Also, the port 402 may include a plurality of pins. For example, the port 402 may include a power supply pin 404 (e.g., a VBUS pin) for supplying power of the external power supply to the electronic device, and a communication pin 406 (e.g., a CC pin, an ID pin, and a D+/D− pin) for transmitting and receiving data to/from the electronic device.

According to an embodiment, the communication unit 408 may establish communication with the electronic device. For example, when an interface for wiredly transmitting and receiving data is included, the communication unit 408 may receive, through the communication pin 406 of the port 402, voltage level information associated with the voltage of charging power supplied by the electronic device. For example, the voltage level information may include a first voltage (e.g., 3.4V to 4.4V) and a second voltage (e.g., 5V) obtained by stepping up the first voltage to a predetermined level. As another example, the communication unit 408 may include an interface for wirelessly transmitting and receiving data. In this instance, the communication unit 408 may support a magnetic induction scheme, a magnetic resonance scheme, or the like.

According to an embodiment, the communication unit 408 may provide voltage level information received from the electronic device to the controller 410.

According to an embodiment, the controller 410 may determine power to be supplied to the electronic device, based on the voltage level information received through the communication unit 408. For example, when the electronic device supports the power of the first voltage, the controller 410 may control the battery 412 and the power converting unit 414 such that the power of the first voltage is supplied to the electronic device. For example, the fact that the electronic device supports the power of the first voltage may indicate that the electronic device is capable of operating at least one internal device (e.g., an application, a display, and the like) with the power of the first voltage. For example, the controller 410 may control the power converting unit 414 such that the power of the first voltage of the battery 412 is supplied to the electronic device. Also, when the electronic device supports power of the second voltage, the controller 410 may control the battery 412 and the power converting unit 414 such that the power of the second voltage is supplied to the electronic device. For example, when the electronic device supports the power of the second voltage, this indicates that the electronic device receives the power of the second voltage, and operates at least one internal device by stepping down the power of the second voltage to the power of the first voltage. For example, the controller 410 may control the power converting unit 414 such that the power of the second voltage, which is obtained by stepping up the power of the first voltage to a predetermined level, is supplied to the electronic device.

According to an embodiment, the battery 412 may include at least one cell and may be charged by an external power supply. Also, the battery 412 may supply power (e.g., charging power) to the electronic device. For example, the battery 412 may supply the power of the first voltage to the power converting unit 414 such that power is supplied to the electronic device. According to an embodiment, the battery 412 may include a rechargeable battery and/or a solar battery.

According to an embodiment, the power converting unit 414 may step up the output voltage of the battery 412 to a predetermined level. For example, when the electronic device supports the power of the first voltage, the power converting unit 414 may supply the power of the first voltage supplied from the battery 412 to the electronic device through the power pin 404 of the port 402. Also, when the electronic device supports the power of the second voltage, the power converting unit 414 may step up the voltage of the power supplied from the battery 412 to the second voltage, which corresponds to a predetermined level, and provide the stepped-up power to the electronic device through the power pin 404 of the port 402. For example, the power converting unit 414 may include a boost converter.

Figure 4B:
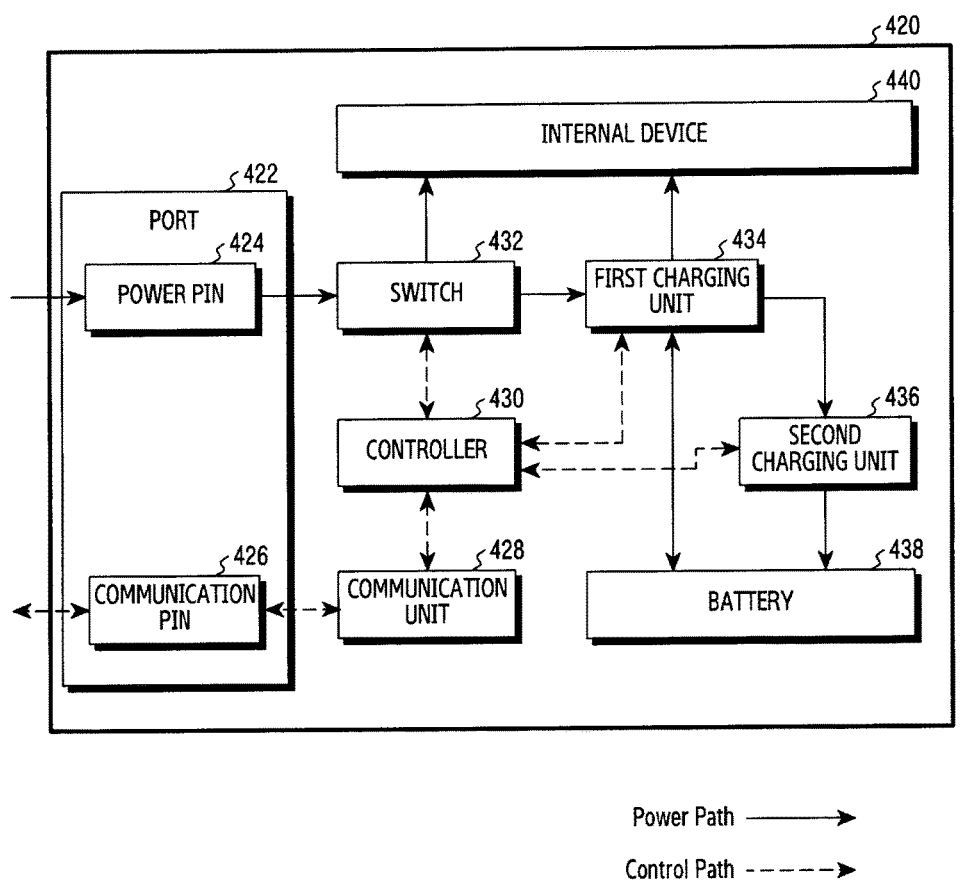
FIG. 4B is a diagram illustrating a configuration of an electronic device according to various embodiments of the present disclosure.

FIG. 4B is a diagram illustrating a configuration of an electronic device according to various embodiments of the present disclosure.

Referring to FIG. 4B, an electronic device 420 may include a port 422, a communication unit 428, a controller 430, a switch 432, a first charging unit (or a first charging circuit) 434, a second charging unit (or a second charging circuit) 436, a battery 438, and an internal device 440.

According to an embodiment, the port 422 may connect the electronic device 420 and the external power supply 400. For example, the port 422 may be provided in a structure with which the external power supply 400, a cable connected with the external power supply 400, or the like are capable of being connected. For example, the port 422 may include a universal serial bus (USB) port. Also, the port 422 may include a plurality of pins. For example, the port 402 may include a power pin 424 (e.g., a VBUS pin) for receiving power from the external power supply, and a communication pin 426 (e.g., a CC pin, an ID pin, and a D+/D− pin) for transmitting and receiving data to/from the external power supply.

According to an embodiment, the communication unit 428 may establish communication with the external power supply 400, thereby transmitting and receiving data from/to the external power supply 400. For example, when an interface that wiredly transmits and receives data is included, the communication unit 428 may transmit voltage level information to the external power supply through the communication pin 426 of the port 422. For example, the voltage level information may be information associated with the voltage of charging power supported by the electronic device 420. Also, the voltage level information may include a first voltage and a second voltage obtained by stepping up the first voltage to a predetermined level. As another example, when an interface that wirelessly transmits and receives data is included, the communication unit 428 may transmit the voltage level information to the external power supply 400 by using a magnetic induction scheme, a magnetic resonance scheme, and the like.

According to an embodiment, the controller 430 may establish a supply path of power received from the external power supply 400. For example, the controller 430 may control the switch 432 that is electrically connected to the first charging unit 434 and at least one internal device 440. Also, the controller 430 may control the switch 432 to select one of the first charging unit 434 and the at least one internal device 440 based on the voltage of power supplied from the external power supply 400 through the power pin 424 of the port 422. For example, when the power of the first voltage, which is capable of driving the internal device 440 without a separate stepdown operation, is supplied from the external power supply 400, the controller 430 may control the switch 432 to establish a power supply path such that the supplied power is supplied to the internal device 440. Also, when the power of the second voltage, which is capable of driving the internal device 440 after a stepdown operation, is supplied from the external power supply 400, the controller 430 may control the switch 432 to establish a power supply path such that the supplied power is supplied to the first charging unit 434.

According to an embodiment, the controller 430 may supply at least a part of operating power of the internal device 440 as charging power. For example, when operating power, the amount of which is greater than the amount of operating power required for operating the internal device 440, is supplied to the internal device 440, the controller 430 may control the first charging unit 434 and the second charging unit 436 such that at least a part of the operating power is supplied to the battery 438.

According to an embodiment, the controller 430 may establish a supply path of charging power based on the difference between the battery of the electronic device 420 (e.g., an internal battery) and the battery of the external power supply 400 (e.g., an external battery). For example, when it is determined that the voltage of the internal battery is higher than the voltage of the external battery, the controller 430 may perform processing such that the first charging unit 434 operates in the boost-mode (e.g., a rapid charging mode) and power that is stepped up to a predetermined level voltage is supplied to the battery 438. Also, the controller 430 may perform processing such that the second charging unit 436 operates in the bypass-mode or the buck-mode, while the first charging unit 434 operates in the boost-mode. For example, when the voltage of the power that is stepped up to a predetermined level is lower than the voltage of the battery 438, the controller 430 may perform processing such that the second charging unit 436 operates in the bypass-mode. For example, the fact that the voltage of the power that is stepped up to the predetermined level is lower than the voltage of the battery 438 may indicate that a current within a range of current that does not affect (e.g., heat) the battery is supplied. As another example, when the voltage of the power that is stepped up to a predetermined level is higher than the voltage of the battery 438, the controller 430 may perform processing such that the second charging unit 436 operates in the buck-mode. For example, the fact that the voltage of the power, which is stepped up to the predetermined level, is higher than the voltage of the battery 438 may indicate that a current within a range of current that may affect the battery is supplied.

As another example, when it is determined that the voltage of the internal battery is lower than the voltage of the external battery, the controller 430 may perform processing such that the first charging unit 434 operates in the bypass-mode, and power supplied from the external power supply 400 is supplied to the battery 438. Also, the controller 430 may perform processing such that the second charging unit 436 operates in the buck-mode or the bypass-mode, while the first charging unit 434 operates in the bypass-mode. For example, when the voltage of power supplied from the external power supply 400 is lower than the voltage of the battery 438, the controller 430 may perform processing such that the second charging unit 436 operates in the bypass-mode. As another example, when the voltage of power supplied from the external power supply 400 is higher than the voltage of the battery 438, the controller 430 may perform processing such that the second charging unit 436 operates in the buck-mode.

According to various embodiments, when an overvoltage or an overcurrent is detected in the internal device 440 or the battery 438 due to power supplied from the external power supply 400, the controller 430 may control the switch 432 to interrupt the supply of power.

According to an embodiment, the switch 432 may be electrically connected to the first charging unit 434 and at least one internal device 440. Also, the switch 432 may select one of the first charging unit 434 and the at least one internal device 440 to establish a supply path under the control of the controller 430.

According to an embodiment, the internal device 440 may include various elements included in the electronic device 420 and a circuit pattern that connects the elements. For example, the various elements may include: a processor (e.g., an application processor, a communication processor, or the like) that controls operation of the electronic device 420; an audio processing unit including a microphone for collecting voice, a speaker for playing back voice, and the like; a radio frequency (RF) unit for establishing a communication channel with an external system; a data processing unit for processing data received by the RF unit; a key input unit for generating a key input signal; a camera for photographing an image; a display for displaying an image, or the like.

According to an embodiment, the first charging unit 434 and the second charging unit 436 may be separated logically or physically, and operate independently from each other. For example, the first charging unit 434 may support the boost-mode and the bypass-mode, and the second charging unit 436 may support the buck-mode and the bypass-mode. Also, the first charging unit 434 may additionally support the buck-mode.

According to an embodiment, the first charging unit 434 may step down the power of the second voltage supplied from the external power supply 400 to the power of the first voltage which is in a range of voltage capable of operating the internal device 440, and may supply the power of the first voltage to the internal device 440.

According to an embodiment, the first charging unit 434 may supply at least a part of operating power supplied from the external power supply 400 to the second charging unit 436. For example, when it is determined that the voltage of the internal battery is higher than the voltage of the external battery, the first charging unit 434 may operate in the boost-mode, step up the power supplied from the external power supply 400 to a predetermined level, and provide the stepped-up power to the second charging unit 436. As another example, when it is determined that the voltage of the internal battery is lower than the voltage of the external battery, the first charging unit 434 may operate in the bypass-mode, and provide the power supplied from the external power supply 400 to the second charging unit 436.

According to an embodiment, the second charging unit 436 may supply power supplied from the first charging unit 434 to the battery 438. For example, the second charging unit 436 may control a current (the amount of current) supplied to the battery 438, based on the state of charge of the battery 438, the amount of current that may be supplied from the battery 438, the voltage of the battery 438, and the like. For example, when it is determined that a current in a reference range is supplied to the battery 438 by power supplied from the first charging unit 434, or when it is determined that the voltage of the supplied power is lower than the voltage of the battery 438, the second charging unit 436 may operate in the bypass-mode. Also, when a current beyond the reference range is supplied to the battery 438 by the power supplied from the first charging unit 434 or when it is determined that the voltage of the supplied power is higher than that of the battery 438, the second charging unit 436 may operate in the buck-mode and perform processing such that a current less than or equal to a predetermined level is supplied to the battery 438.

According to an embodiment, the battery 438 may include at least one cell and may be charged by power supplied from the external power supply 400. Also, the battery 438 may supply power to the internal device 440. For example, the battery 438 may include, for example, a rechargeable battery and/or a solar battery.

Figure 5:
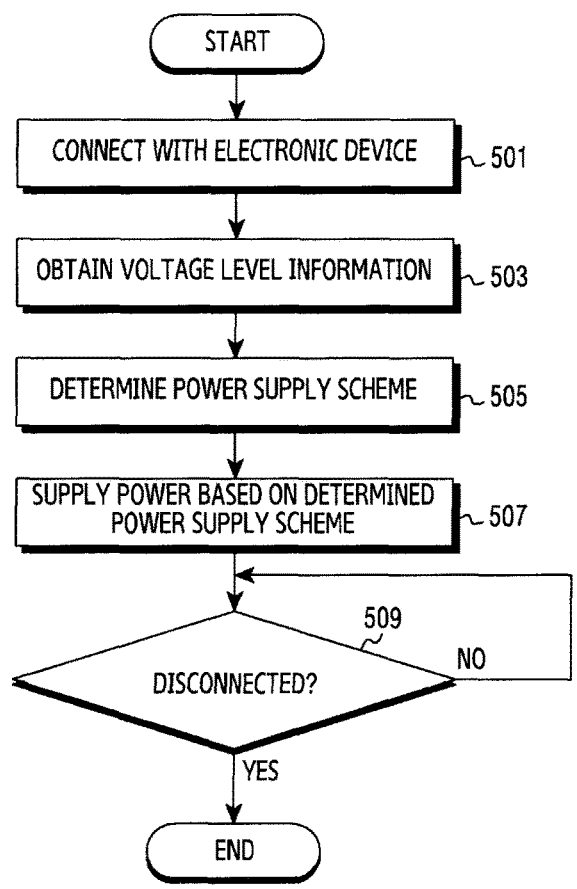
FIG. 5 is a flowchart illustrating a power supplying operation of an external power supply according to various embodiments of the present disclosure.

FIG. 5 is a flowchart illustrating a power supplying operation of the external power supply 400 according to various embodiments of the present disclosure.

Referring to FIG. 5, the external power supply 400 may establish a connection with the electronic device 420 in operation 501. According to an embodiment, the external power supply 400 may establish a connection with the electronic device 420 through at least one of a wireless connection and a wired connection.

In operation 503, the external power supply 400 may obtain (or acquire) voltage level information from the electronic device 420. For example, the voltage level information may be information associated with the voltage of charging power supported by the electronic device 420.

In operation 505, the external power supply 400 may determine a power supply scheme based on the voltage level information. For example, the external power supply 400 may determine whether the electronic device 420 supports the charging power of a first voltage, or the charging power of a second voltage, based on the obtained voltage level information. For example, the first voltage may be the voltage generated by the battery 412 of the external power supply 400, and the second voltage may be voltage obtained by stepping up the first voltage generated by the battery 412 of the external power supply 400 to a predetermined level.

In operation 507, the external power supply 400 may supply charging power to the electronic device 420 based on the determined power supply scheme. For example, when it is determined that the electronic device 420 supports charging power of the first voltage, the external power supply 400 may supply the charging power of the first voltage to the electronic device 420. As another example, when it is determined that the electronic device 420 supports charging power of the second voltage, the external power supply 400 may supply the charging power of the second voltage to the electronic device 420.

In operation 509, the external power supply 400 may determine whether the electronic device 420 has disconnected. For example, disconnection may indicate that the supply of power from the external power supply 400 to the electronic device 420 has been interrupted.

When the connection with the electronic device 420 is not disconnected, the external power supply 400 may supply charging power. For example, the external power supply 400 may perform operations related to operation 507 or operation 509 until the disconnection from the electronic device 420 is detected.

When the connection with the electronic device 420 is disconnected, the external power supply 400 may interrupt the supply of charging power to the electronic device 420.

Figure 6:
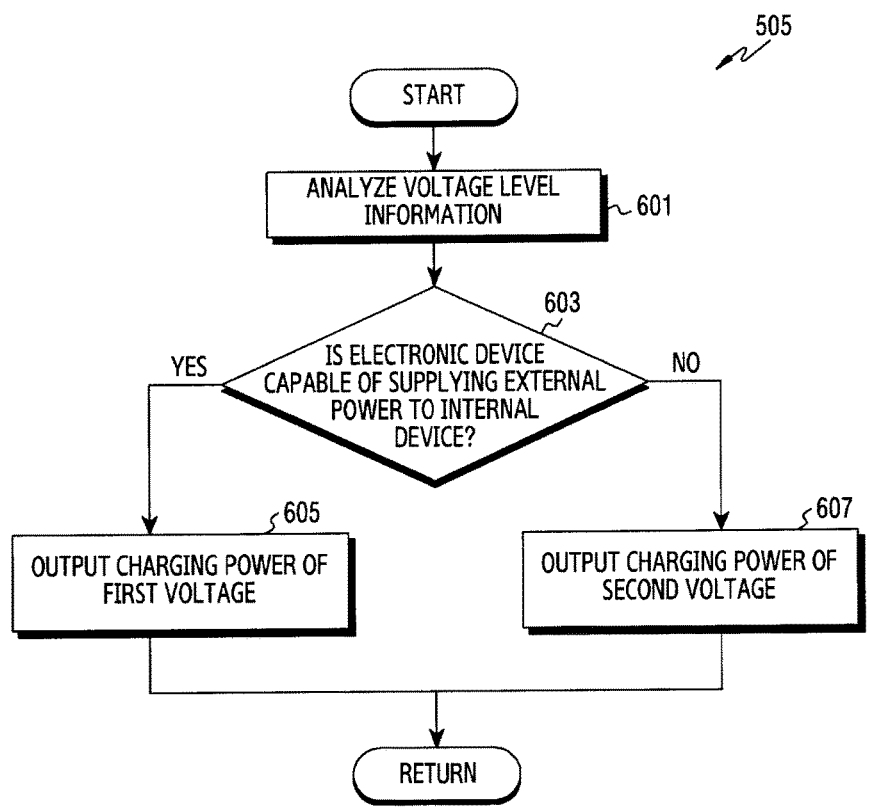
FIG. 6 is a flowchart illustrating a procedure of determining a power supply scheme by an external power supply according to various embodiments of the present disclosure.

FIG. 6 is a flowchart illustrating a procedure of determining a power supply scheme by the external power supply 400 according to various embodiments of the present disclosure. According to an embodiment, the procedure of determining the power supply scheme may correspond to the detailed operation of operation 505 of FIG. 5.

Referring to FIG. 6, the external power supply 400 may analyze voltage level information obtained from the electronic device 420 in operation 601.

In operation 603, the external power supply 400 may identify or process the analysis result associated with the voltage level information. For example, the external power supply 400 may process the analysis result to determine whether the electronic device 420 is capable of supplying external power to the internal device 440. For example, supplying the external power to the internal device 440 may indicate that the external power that is not stepped down to a predetermined level is supplied to the internal device 440.

When it is determined that the electronic device 420 is capable of supplying external power to the internal device 440, the external power supply 400 may output charging power of a first voltage (e.g., 3.4V to 4.4V) in operation 605. For example, when the voltage of the battery 412 is set to the first voltage, the external power supply 400 may supply the power from the battery 412 directly to the electronic device 420.

When it is determined that the electronic device 420 is incapable of supplying external power to the internal device 440, the external power supply 400 may output a charging power using a second voltage (e.g., 5V) in operation 607. For example, when the voltage of the battery 412 is set to the first voltage, the external power supply 400 may step up the battery voltage to the second voltage such that power of the second voltage is supplied to the electronic device 420.

Figure 7:
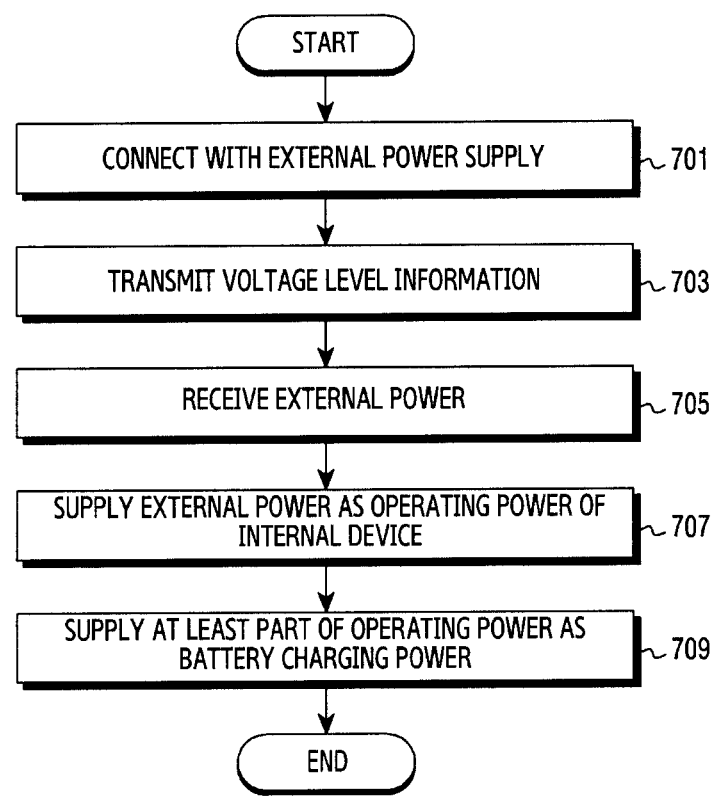
FIG. 7 is a flowchart illustrating a battery charging operation of an electronic device according to various embodiments of the present disclosure.

FIG. 7 is a flowchart illustrating a battery charging operation of the electronic device 420 according to various embodiments of the present disclosure.

Referring to FIG. 7, in operation 701, the electronic device 420 may establish a connection with the external power supply 400. According to an embodiment, the electronic device 420 may establish a connection with the external power supply 400 through at least one of a wireless connection and a wired connection.

In operation 703, the electronic device 420 may transmit voltage level information to the external power supply 400. For example, the voltage level information may indicate information associated with the voltage of charging power supported by the electronic device 420. For example, the electronic device 420 may transmit voltage information associated with power that may be supplied to the internal device 440, as the voltage level information. In operation 705, the electronic device 420 may receive external power from the external power supply 400. According to an embodiment, the electronic device 420 may receive the external power having the first voltage, which is capable of driving the internal device 440 without a separate stepdown operation.

In operation 707, the electronic device 420 may supply external power as operating power of the internal device 440. For example, the electronic device 420 may establish a power supply path to directly supply external power to the internal device 440, instead of supplying the external power to a charging unit (e.g., the first charging unit 434).

In operation 709, the electronic device 420 may supply at least a part of operating power as charging power. For example, the electronic device 420 may perform processing such that at least one internal device (e.g., application processor) 440 is operated by the power of the first voltage supplied from the external power supply 400. Also, the electronic device 420 may supply, to the battery 438, power remaining after excluding power required for operating the at least one internal device 440 from the supplied external power.

Figure 8:
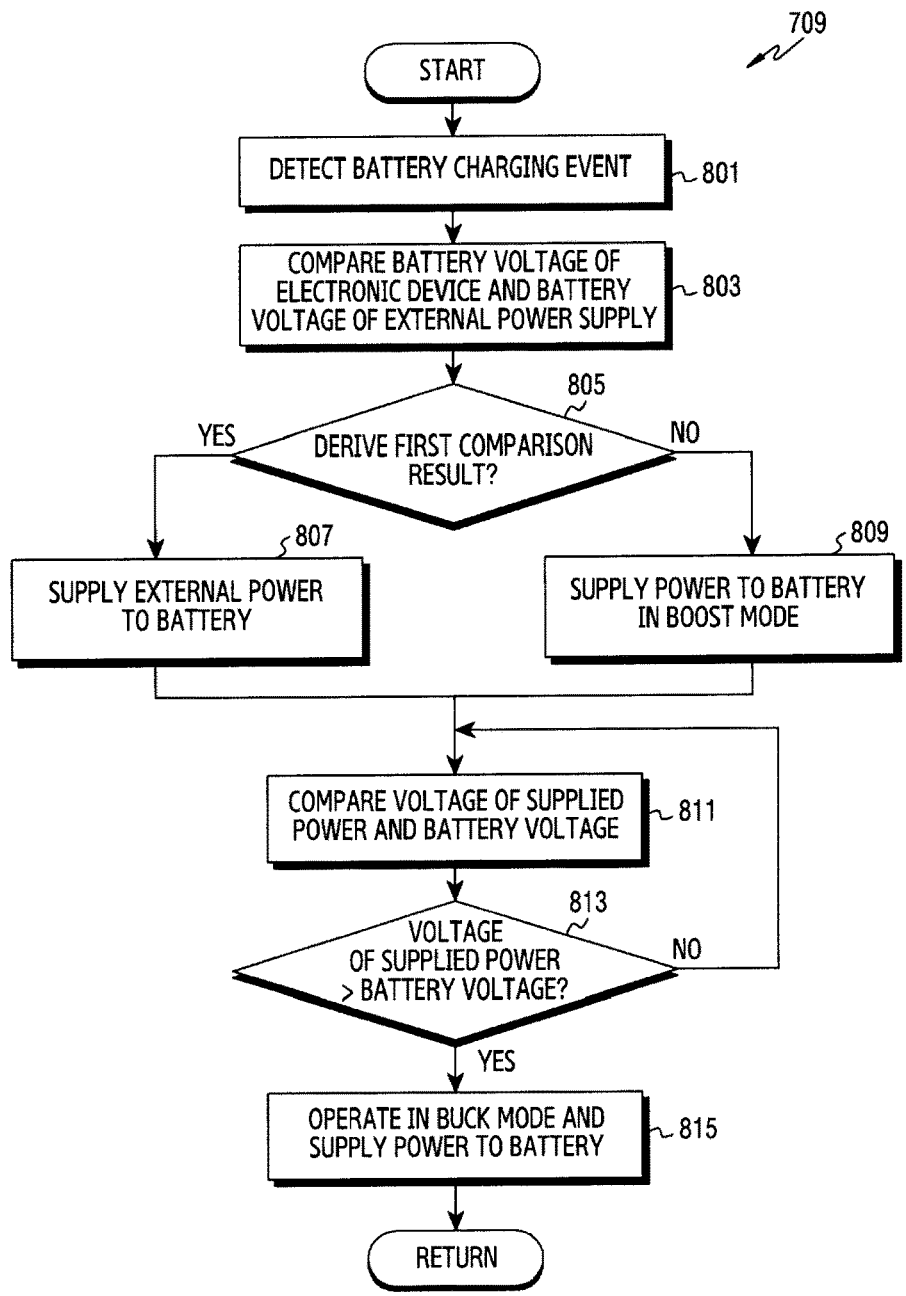
FIG. 8 is a flowchart illustrating a procedure of supplying charging power by an electronic device according to the present disclosure.
Figure 9:
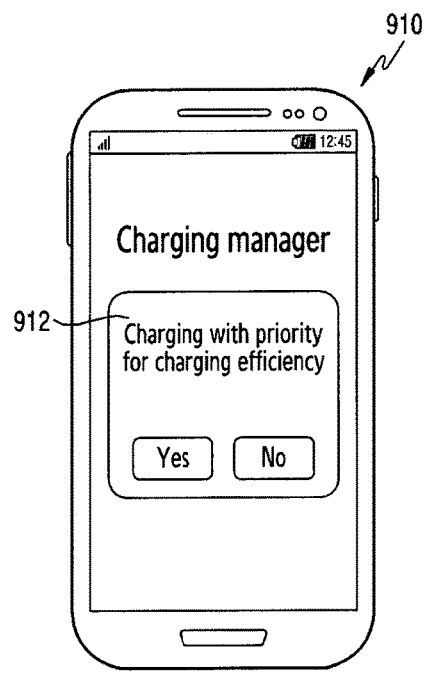
FIG. 9 is a diagram illustrating an example of a procedure of supplying charging power according to various embodiments of the present disclosure.

FIG. 8 is a flowchart illustrating a process of supplying charging power by the electronic device 420 according to the present disclosure. FIG. 9 is a diagram illustrating an example for describing a procedure of supplying charging power according to various embodiments of the present disclosure.

According to an embodiment, the procedure of supplying charging power may correspond to the detailed operation of operation 709 of FIG. 7.

Referring to FIG. 8, in operation 801, the electronic device 420 may detect a battery charging event. For example, the battery charging event may be a situation in which power is supplied in an amount which is larger than the amount required for operation of the internal device 440, from the external power supply 400. For example, the electronic device 420 may store, in advance, information associated with the amount of power required for operation of each internal device 440 (e.g., among a plurality of possible internal devices), and may calculate an operating power for the at least one internal device 440 being driven (or executed). Also, the electronic device 420 may detect the event based on the calculated operating power and power supplied from the external power supply 400.

In operation 803, the electronic device 420 may compare the voltage of the battery 438 of the electronic device 420 (e.g., an internal battery) and the voltage of the battery 412 of the external power supply 400 (e.g., an external battery). For example, the electronic device 420 may determine the difference in voltage between the internal battery 438 and the external battery 412.

In operation 805, the electronic device 420 may determine whether a first comparison result is derived. For example, the first comparison result may be a result indicating that the voltage of the external battery 412 is equal to or higher than the voltage of the internal battery 438. Conversely, a second comparison result may indicate that the voltage of the internal battery 438 is higher than the voltage of the external battery 412.

When it is determined that the first comparison result is derived, the electronic device 420 may supply external power to the battery 438 in operation 807. For example, the electronic device 420 may supply, to the battery 438, power of a first voltage, which is supplied from the external power supply 400. Also, as illustrated in FIG. 9, the electronic device 420 may provide display 910 of a screen 912, for enabling selection of a function to begin a type of charging that prioritizing charging efficiency. For example, the electronic device 420 improves charging efficiency by supplying the power of the first voltage to the battery 438, responsive to the input selecting charging that prioritizes charging efficiency. As another example, the electronic device 420 may operate in a 'boost-mode' charging, and supply power of a second voltage to the battery 438 based on an input indicating activation of charging that does not prioritize charging efficiency. Therefore, the electronic device 420 may charge under the boost mode scheme which shortens battery charging time.

When it is determined that the second comparison result is derived, the electronic device 420 may operate in 'boost-mode,' and supply external power to the battery 438 in operation 809. For example, the electronic device 420 may step up the power of the first voltage supplied from the external power supply 400 to the power of the second voltage, and supply the power of the second voltage to the battery 438.

When the power is supplied to the battery 438, the electronic device 420 may compare the voltage of the power supplied to the battery 438 and the voltage of the battery 438 in operation 811.

In operation 813, the electronic device 420 may determine whether the voltage of the power supplied to the battery 438 is higher than the voltage of the battery 438. For example, the fact that the voltage of the power supplied to the battery 438 is higher than the voltage of the battery 438 may indicate that a current within a range of current that may affect the battery being supplied (e.g., such as by generating excessive heat).

When it is determined that the voltage of the power supplied to the battery 438 is lower than the voltage of the battery 438, the electronic device 420 may supply power to the battery 438. For example, the electronic device 420 may perform operations associated with operation 811 or operation 813.

When it is determined that the voltage of the power supplied to the battery 438 is higher than the voltage of the battery 438, the electronic device 420 may operate in 'buck-mode,' and may supply power to the battery 438 in operation 815. For example, the electronic device 420 may step down the power of the first voltage or the power of the second voltage to a predetermined level, and may supply the same to the battery 438. For example, the electronic device 420 may operate in buck-mode, and may reduce the amount of current supplied to the battery 438.

Figure 10A:
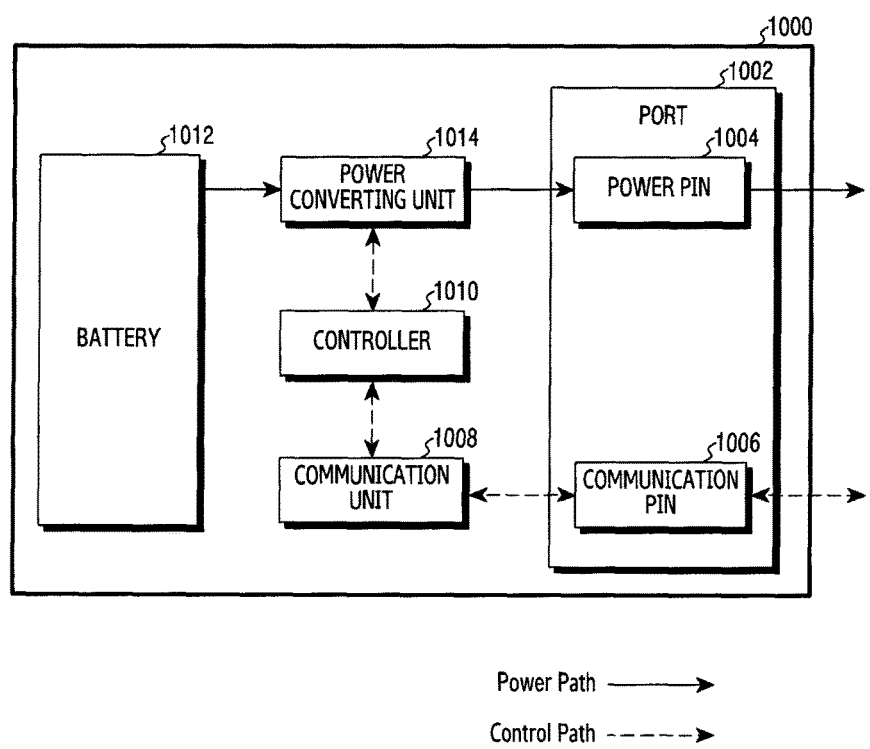
FIG. 10A is a diagram illustrating another configuration of an external power supply that supplies power to an electronic device according to various embodiments of the present disclosure.

FIG. 10A is a diagram illustrating another configuration of an external power supply that supplies power to an electronic device according to various embodiments of the present disclosure.

Referring to FIG. 10A, an external power supply 1000 may include a port 1002, a communication unit 1008, a controller 1010, a battery 1012, and a power converting unit 1014. The external power supply 1000 of FIG. 10A is different from the external power supply 400 of FIG. 4A in that the external power supply 1000 does not perform an operation of determining power to be supplied to the electronic device. Accordingly, hereinafter, the configurations of the communication unit 1008 and the controller 1010 will be described in detail, and descriptions of the remaining elements (e.g., the port 1002, the battery 1012, power converting unit 1014, and the communication pin 1006) will be omitted.

According to an embodiment, the communication unit 1008 may establish communication with an electronic device, and may provide voltage level information to the electronic device. For example, the voltage level information may be associated with the voltage of power that may be supplied by the external power supply 1000. For example, the voltage level information may include a first voltage and a second voltage obtained by stepping up the first voltage to a predetermined level.

According to an embodiment, the communication unit 1008 may receive a power supply request from the electronic device. For example, the power supply request may include a request for supplying power of the first voltage and a request for supplying power of the second voltage. According to an embodiment, the communication unit 1008 may provide the power supply request received from the electronic device to the controller 1010.

According to an embodiment, the controller 1010 may determine power to be supplied to the electronic device, based on the power supply request received through the communication unit 1008. For example, when the electronic device requests the power of the first voltage, the controller 1010 may control the battery 1012 and the power converting unit 1014 such that the power of the first voltage is supplied to the electronic device. For example, the controller 1004 may control the power converting unit 1014 such that the power of the first voltage of the battery 1012 is supplied to the electronic device. Also, when the electronic device requests power of the second voltage, the controller 1010 may control the battery 1012 and the power converting unit 1014 such that the power of the second voltage is supplied to the electronic device. For example, the controller 1010 may control the power converting unit 1014 such that the power of the second voltage, which is obtained by stepping up the power of the first voltage to a predetermined level, is supplied to the electronic device.

Figure 10B:
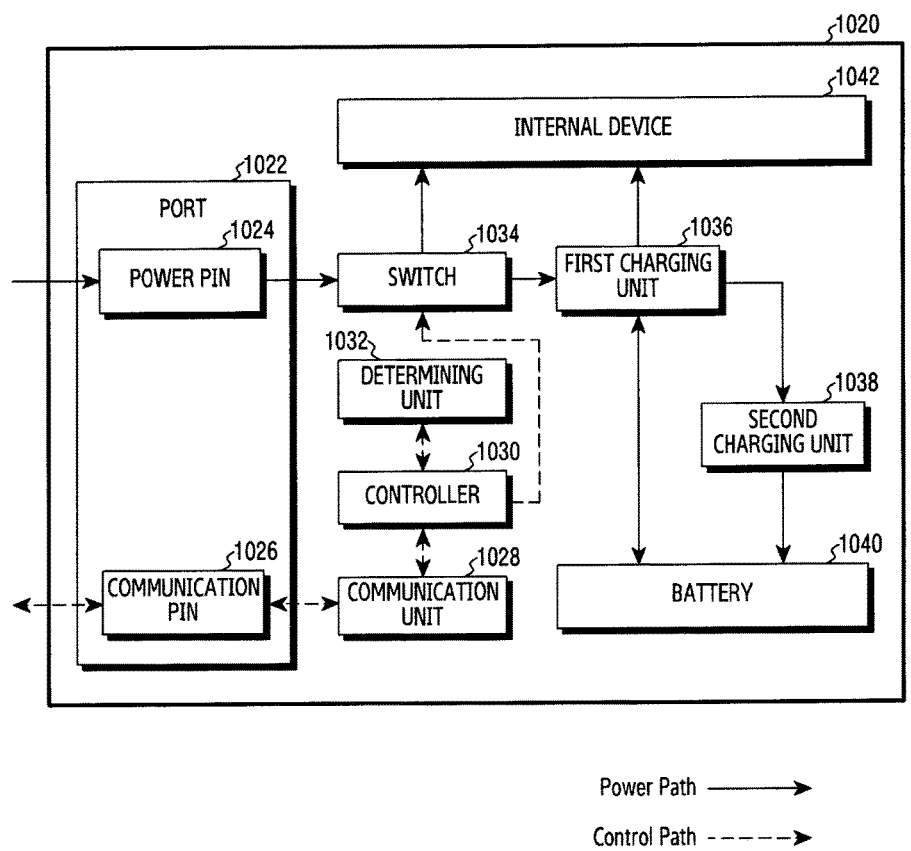
FIG. 10B is a diagram illustrating another configuration of an electronic device according to various embodiments of the present disclosure.

FIG. 10B is a diagram illustrating another configuration of an electronic device according to various embodiments of the present disclosure.

Referring to FIG. 10B, an electronic device 1020 may include a port 1022, a communication unit 1028, a controller 1030, a determining unit 1032, a switch 1034, a first charging unit (or a first charging circuit) 1036, a second charging unit (or a second charging circuit) 1038, a battery 1040, and an internal device 1042. The electronic device 1020 of FIG. 10B is different from the electronic device 420 of FIG. 4B in that the electronic device 1020 autonomously determines supply power. Accordingly, hereinafter, the configurations of the communication unit 1028 and the determining unit 1032 will be described in detail, and descriptions of the remaining elements (e.g., the port 1022, the switch 1034, the internal device 1042, the first charging unit 1036, the second charging unit 1038, the battery 1040, the power pin 1024 and the communication pin 1026) will be omitted.

According to an embodiment, the communication unit 1028 may establish communication with the external power supply 1000, and receive voltage level information from the external power supply 1000. For example, the voltage level information may be associated with the voltage of power that may be supplied by the external power supply 1000. For example, the voltage level information may include a first voltage and a second voltage obtained by stepping up the first voltage to a predetermined level. According to an embodiment, the communication unit 1028 may provide, to the determining unit 1032, the voltage level information received from the external power supply 1000. Also, the communication unit 1028 may transmit a power supply request that designates supply power to the external power supply 1000.

According to an embodiment, the determining unit 1032 may determine supply power of the external power supply 1000 based on the voltage level information received through the communication unit 1028. For example, when the external power supply 1000 supports the power of the first voltage, the determining unit 1032 may determine the power of the first voltage as supply power. Also, when the external power supply 1000 supports the power of the second voltage, the determining unit 1032 may determine the power of the second voltage as supply power. According to an embodiment, the determining unit 1032 may generate a power supply request based on the determination result, and provides the same to the external power supply 1000 through the communication unit 1028.

Figure 11:
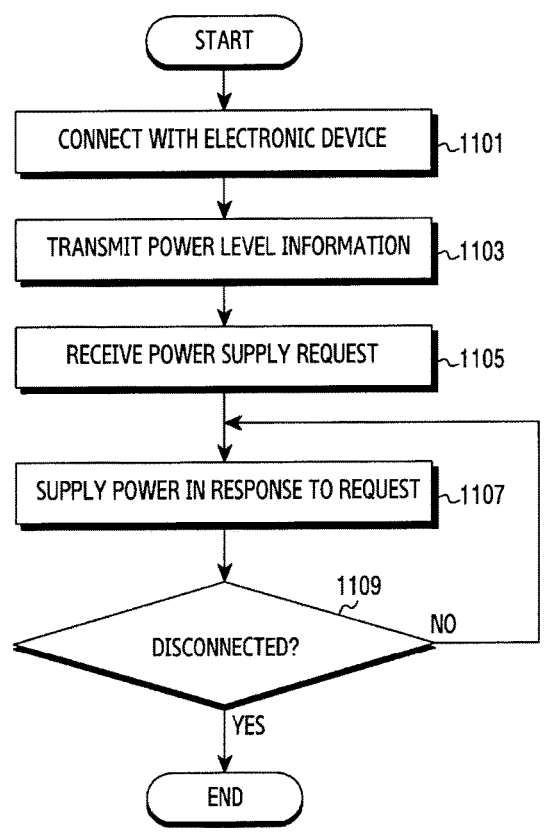
FIG. 11 is a flowchart illustrating a power supplying operation of an external power supply according to various embodiments of the present disclosure.

FIG. 11 is a flowchart illustrating a power supplying operation of the external power supply 1000 according to various embodiments of the present disclosure.

Referring to FIG. 11, in operation 1101, the external power supply 1000 may establish a connection with the electronic device 1020. According to an embodiment, the external power supply 1000 may establish a connection with the electronic device 1020 through at least one of a wireless connection and a wired connection.

In operation 1103, the external power supply 1000 may transmit voltage level information to the electronic device 1020. For example, the voltage level information may be associated with the voltage of power that may be supplied by the external power supply 1000. For example, the external power supply 1000 may transmit voltage level information indicating that the external power supply 1000 is capable of supplying the power of the first voltage or the power of the second voltage that is higher than the first voltage.

In operation 1105, the external power supply 1000 may receive a power supply request from the electronic device 1020. For example, the power supply request may include the voltage of supply power designated by the electronic device 1020.

In operation 1107, the external power supply 1000 may supply charging power in response to the request. For example, when the electronic device 1020 requests charging power of the first voltage, the external power supply 1000 may supply the charging power of the first voltage to the electronic device 1020. As another example, when the electronic device 1020 requests charging power of the second voltage, the external power supply 1000 may supply the charging power of the second voltage to the electronic device 1020.

In operation 1109, the external power supply 1000 may determine whether the connection with the electronic device 1020 is disconnected. For example, the disconnection may mean that the supply of power from the external power supply 1000 to the electronic device 1020 has been interrupted.

When the connection with the electronic device 1020 has not been interrupted, the external power supply 1000 may continue supplying charging power. For example, the external power supply 1000 may perform operations related to operation 1107 or operation 1109 until the disconnection from the electronic device 1020 is detected.

Figure 12:
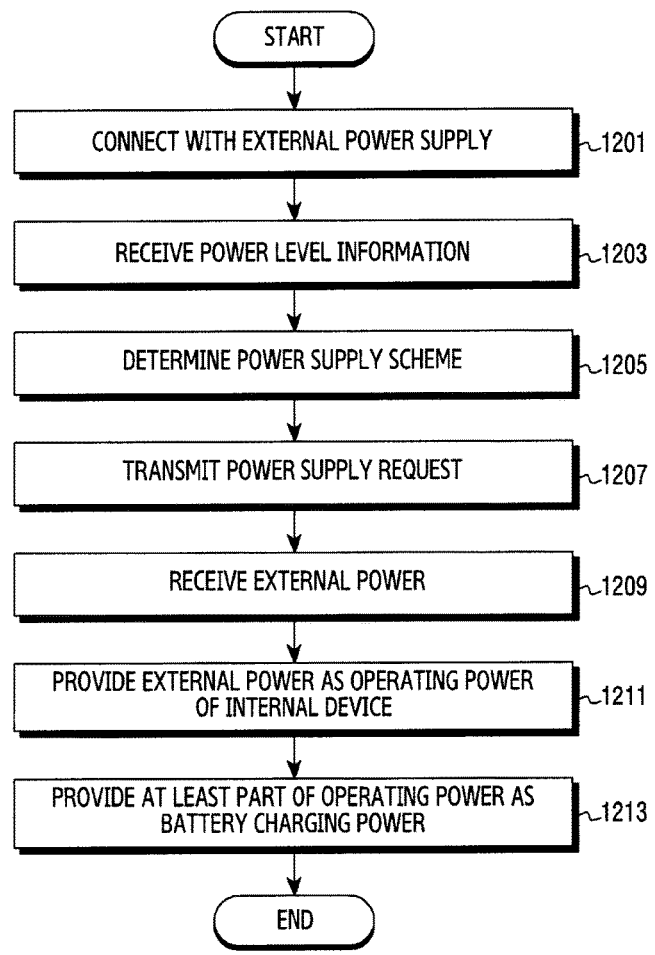
FIG. 12 is a flowchart illustrating a battery charging operation of an electronic device according to various embodiments of the present disclosure.

FIG. 12 is a flowchart illustrating a battery charging operation of the electronic device 1020 according to various embodiments of the present disclosure.

Referring to FIG. 12, in operation 1201, the electronic device 1020 may establish a connection with the external power supply 1000. According to an embodiment, the electronic device 1020 may establish a connection with the external power supply 1000 through at least one of a wireless connection and a wired connection.

In operation 1203, the electronic device 1020 may receive voltage level information from the external power supply 1000. For example, the voltage level information may be associated with the voltage of power that may be supplied by the external power supply 1000.

In operation 1205, the electronic device 1020 may determine a power supply scheme based on the voltage level information. For example, when the external power supply 1000 supplies power of a first voltage capable of operating the internal device 1042 of the electronic device 1020, the electronic device 1020 may determine that power to be received is power that is not stepped up.

In operation 1207, the electronic device 1020 may transmit a power supply request based on the determined power supply scheme. For example, the electronic device 1020 may request the external power supply 1000 to supply the power of the first voltage.

In operation 1209, the electronic device 1020 may receive external power from the external power supply 1000. According to an embodiment, the electronic device 1020 may receive the power of the first voltage capable of driving the internal device 1042 without a separate stepdown operation.

In operation 1209, the electronic device 1020 may supply external power as operating power of the internal device 1042. For example, the electronic device 1020 may establish a power supply path so as to directly supply external power to the internal device 1042, instead of supplying the external power to a charging unit (e.g., the first charging unit 1036).

In operation 1211, the electronic device 1020 may supply at least a part of operating power as charging power. For example, the electronic device 1020 may perform processing such that at least one internal device (e.g., application processor) 1042 is operated using the power of the first voltage supplied from the external power supply 1000. Also, the electronic device 1020 may supply, to the battery 1040, power remaining after excluding power required for operating the at least one internal device 1042 from the supplied external power.

Figure 13A:
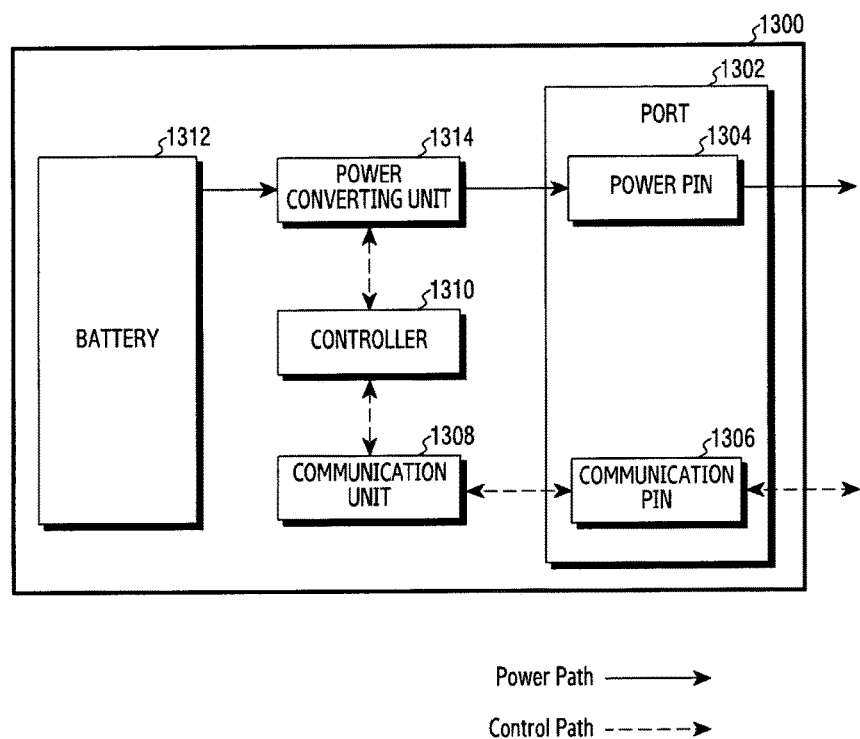
FIG. 13A is a diagram illustrating another configuration of an external power supply that supplies power to an electronic device according to various embodiments of the present disclosure.

FIG. 13A is a diagram illustrating another configuration of an external power supply that supplies power to an electronic device according to various embodiments of the present disclosure.

Referring to FIG. 13A, an external power supply 1300 may include a port 1302, a communication unit 1308, a controller 1310, a battery 1312, and a power converting unit 1314. The external power supply 1300 of FIG. 13A is different from the external power supply 400 of FIG. 4A in that the external power supply 1300 changes the voltage of a battery based on the state of charge of an electronic device.

According to an embodiment, the port 1302 may connect the external power supply 1300 and an electronic device. For example, the port 1302 may be provided in a structure with which the electronic device, a cable connected with the electronic device, or the like are capable of being connected. For example, the port 1302 may include a universal serial bus (USB) port. Also, the port 1302 may include a plurality of pins. For example, the port 1302 may include a power supply pin 404 (e.g., a VBUS pin) for supplying power of the external power supply to the electronic device, and a communication pin 1306 (e.g., a CC pin, an ID pin, and a D+/D− pin) for transmitting and receiving data to/from the electronic device.

According to an embodiment, the communication unit 1308 may receive voltage level information from the electronic device through a communication pin 1306 of a port 1302. For example, the voltage level information may be information associated with the voltage of charging power supported by the electronic device. For example, the voltage level information may include a first voltage (e.g., 3.4V to 4.4V) which is capable of driving an internal device. Also, the communication unit 1308 may receive a power change request from the electronic device. For example, the power change request may be a request for changing the power of the first voltage to power of a second voltage. According to an embodiment, the communication unit 1308 may provide the voltage level information and the power change request received from the electronic device to the controller 1310.

According to an embodiment, the controller 1310 may supply power to the electronic device, based on the voltage level information received through the communication unit 1308. For example, the controller 1310 may control the battery 1312 and the power converting unit 1314 such that power having a voltage capable of driving an internal device is supplied to the electronic device.

According to an embodiment, the controller 1310 may control the battery 1312 and the power converting unit 1314 such that the voltage of power supplied to the electronic device is changed to the second voltage based on the power change request received through the communication unit 1308.

According to an embodiment, the battery 1312 may include at least one cell and may be charged by an external power supply. Also, the battery 1312 may supply the power of the first voltage to the power converting unit 1314 such that power (charging power) is supplied to the electronic device. According to an embodiment, the battery 1312 may include a rechargeable battery and/or a solar battery.

According to an embodiment, the power converting unit 1314 may step up the output voltage of the battery 1312 to a predetermined level. For example, when the electronic device requests the power of the first voltage, the power converting unit 1314 may supply the power of the first voltage supplied from the battery 1312 to the electronic device through a power pin 1304 of the port 1302. Also, when the electronic device supports the power of the second voltage, the power converting unit 1314 may step up the voltage of the power supplied from the battery 1312 to the second voltage, which corresponds to a predetermined level, and provide the step up power to the electronic device through the power supply pin 1304 of the port 402. For example, the power converting unit 1314 may include a boost converter.

Figure 13B:
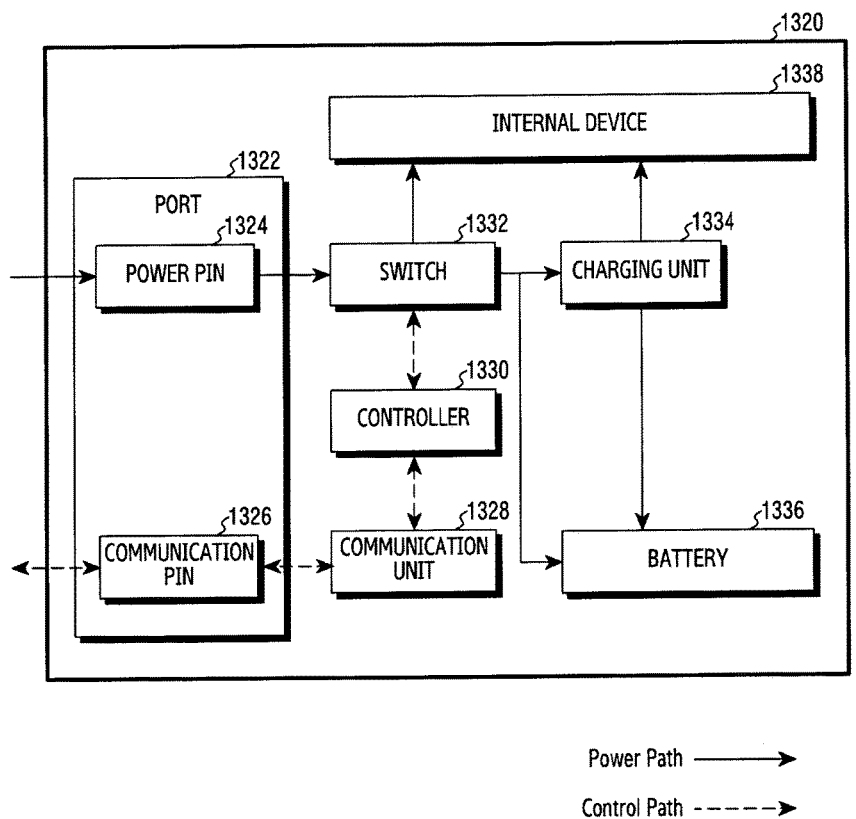
FIG. 13B is a diagram illustrating another configuration of an electronic device according to various embodiments of the present disclosure.

FIG. 13B is a diagram illustrating another configuration of an electronic device according to various embodiments of the present disclosure.

Referring to FIG. 13B, an electronic device 1320 may include a port 1322, a communication unit 1328, a controller 1330, a switch 1332, a charging unit (or a charging circuit) 1334, a battery 1336, and an internal device 1338.

According to an embodiment, the port 1322 may connect the electronic device 1320 and an external power supply 1300. For example, the port 1322 may be provided in a structure with which the external power supply 1300, a cable connected with the external power supply 1300, or the like are capable of being connected. For example, the port 1322 may include a universal serial bus (USB) port. Also, the port 1322 may include a plurality of pins. For example, the port 1302 may include a power supply pin 1324 (e.g., a VBUS pin) for receiving power from the external power supply 1300, and a communication pin 1326 (e.g., a CC pin, an ID pin, and a D+/D− pin) for transmitting and receiving data to/from the external power supply 1300.

According to an embodiment, the communication unit 1328 may transmit voltage level information to the external power supply 1300 through the communication pin 1326 of the port 1322. For example, the voltage level information may be information associated with the voltage of charging power supported by the electronic device 1320. For example, the voltage level information may include a first voltage and a second voltage obtained by stepping up the first voltage to a predetermined level. Also, the communication unit 1328 may transmit a power change request for changing power supplied from the external power supply 1300 to the second voltage.

According to an embodiment, the controller 1330 may establish a supply path of power received from the external power supply 1300. For example, the controller 1330 may control the switch 1332 that is electrically connected to the charging unit 1334 and the battery 1336. Also, the controller 1330 may control switching between the charging unit 1334 and the battery 1336 based on the voltage of power supplied from the external power supply 1300. For example, when the power of the first voltage, which is capable of driving the internal device 1338 without a separate stepdown operation, is supplied from the external power supply 1300, the controller 1330 may control a switch to establish a power supply path, such that the supplied power is supplied to the internal device 1338. Also, when the power of the second voltage which is stepped down is supplied from the external power supply 1300, the controller 1330 may control the switch to establish a power supply path for supplying the power of the second voltage to the battery 1336.

According to an embodiment, the controller 1330 may use power (e.g., the power of the first voltage) supplied from the external power supply 1300 as operating power. Also, the controller 1330 may supply at least a part of the operating power for an internal device as charging power. For example, when operating power, the amount of which is larger than the amount of operating power required for operating the internal device 1338, is secured, the controller 1330 may control the charging unit 1334 such that at least a part of the operating power is supplied to the battery 1336.

According to an embodiment, the controller 1330 may request charging power from the external power supply 1300 based on the difference in voltage between the battery 1336 of the electronic device 1320 (e.g., an internal battery) and the battery 1312 of the external power supply 1300 (e.g., an external battery). For example, when it is determined that the voltage of the internal battery 1336 is higher than the voltage of the external battery 1312, the controller 1330 may receive the power of the second voltage from the external power supply 1300. As another example, when it is determined that the voltage of the internal battery 1336 is lower than the voltage of the external battery 1312, the controller 1330 may receive the power of the first voltage from the external power supply 1300. Also, when a current within a reference range is supplied to the battery 1336 by the supply power, the controller 1330 may control the amount of current supplied to the battery 1336. For example, when a current beyond the reference range is supplied by the power of the second voltage, the controller 1330 may receive the power of the first voltage from the external power supply 1300. As another example, when a current beyond the reference range is supplied by the power of the first voltage, the controller 1330 may control the charging unit 1334 such that the voltage of the supplied power is stepped down to a predetermined level.

According to an embodiment, the charging unit 1334 may support the buck-mode. According to an embodiment, the charging unit 1334 may supply at least a part of the operating power, which is supplied from the internal device 1338, to the battery 1336. Also, when it is determined that a current beyond the reference range is supplied to the battery 1336 by the power supplied from the internal device 1338, the charging unit 1334 operates in the buck-mode, and performs processing such that a current less than or equal to a predetermined level is supplied to the battery 1336.

According to an embodiment, the battery 1336 may include at least one cell and may be charged by power supplied from the external power supply 1300. Also, the battery 1336 may supply power to the internal device 1338. For example, the battery 1336 may include, for example, a rechargeable battery and/or a solar battery.

Figure 14:
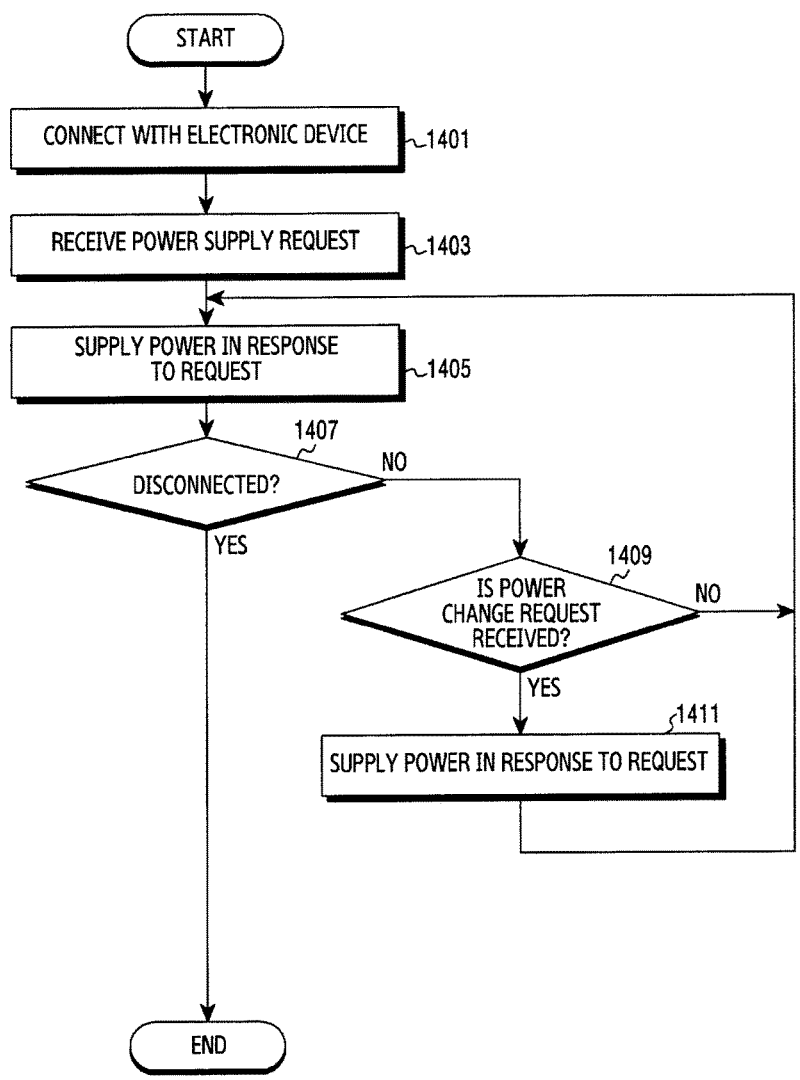
FIG. 14 is a flowchart illustrating a power supplying operation of an external power supply according to various embodiments of the present disclosure.

FIG. 14 is a flowchart illustrating a power supplying operation of the external power supply 1300 according to various embodiments of the present disclosure.

Referring to FIG. 14, in operation 1401, the external power supply 1300 may establish a connection with the electronic device 1320. According to an embodiment, the external power supply 1300 may establish a connection with the electronic device 1320 through at least one of a wireless connection and a wired connection.

In operation 1403, the external power supply 1300 may receive a power supply request from the electronic device 1320. For example, the external power supply 1300 may receive a request for power of a first voltage.

In operation 1405, the external power supply 1300 may supply charging power in response to the request. For example, the external power supply 1300 may supply charging power of the first voltage to the electronic device 1320.

In operation 1407, the external power supply 1300 may determine whether the electronic device 1320 is disconnected. For example, the disconnection may indicate that the external power supply 1300 has interrupted the supply of power to the electronic device 1320.

When the electronic device is not disconnected, the external power supply 1300 may determine whether a power change request is received in operation 1409. For example, the power change request may be a request for changing the power of the first voltage to power of a second voltage.

When it is determined that the power change request is not received, the external power supply 1300 may perform the operation of supplying the power of the first voltage again.

When it is determined that the power change request is received, the external power supply 1300 may supply power in response to the request in operation 1411. For example, the external power supply 1300 may increase the voltage of the power supplied to the electronic device 1320 to the second voltage.

Figure 15:
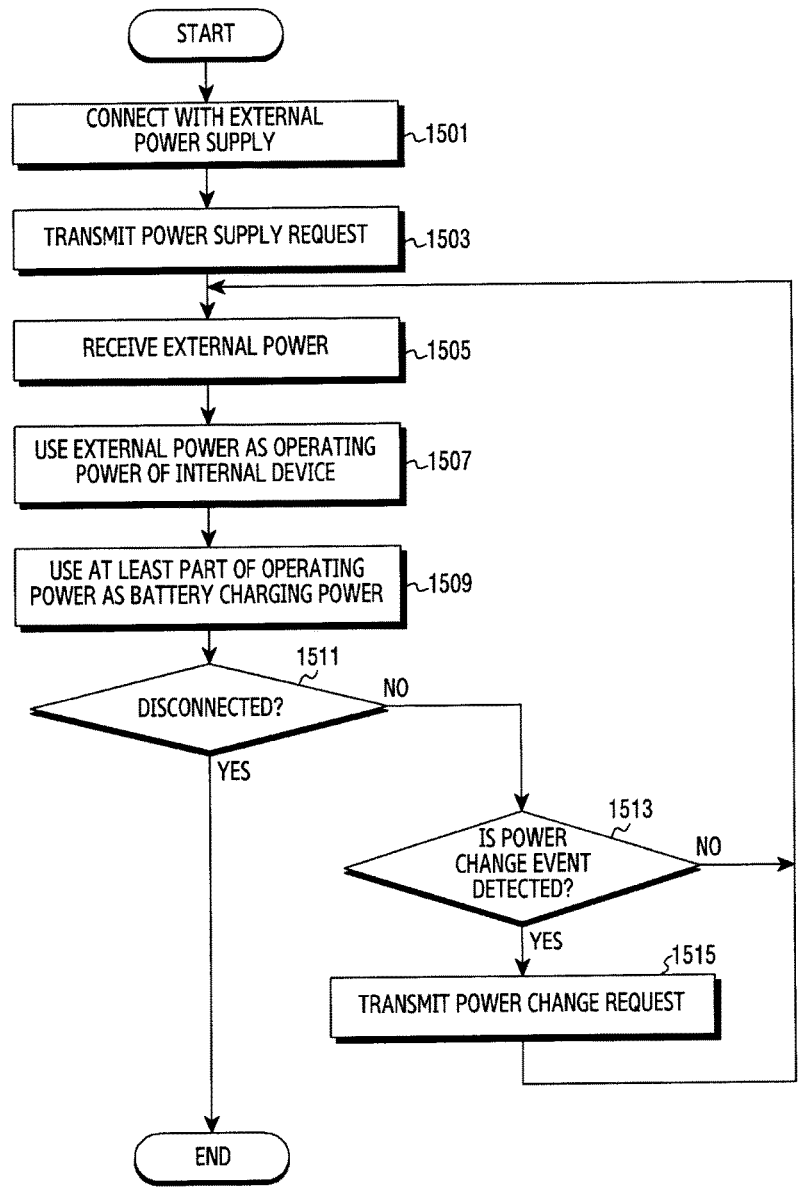
FIG. 15 is a flowchart illustrating a battery charging operation of an electronic device according to various embodiments of the present disclosure.

FIG. 15 is a flowchart illustrating a battery charging operation of the electronic device 1320 according to various embodiments of the present disclosure.

Referring to FIG. 15, in operation 1501, the electronic device 1320 may establish a connection with the external power supply 1300. According to an embodiment, the electronic device 1320 may establish a connection with the external power supply 1300 through at least one of a wireless connection and a wired connection.

In operation 1503, the electronic device 1320 may transmit a power supply request. For example, the electronic device 1320 may request the external power supply 1300 to supply the power of the first voltage.

In operation 1505, the electronic device 1320 may receive external power from the external power supply 1300. According to an embodiment, the electronic device 1320 may receive the power of the first voltage capable of driving the internal device 1338 without a separate stepdown operation.

In operation 1507, the electronic device 1320 may supply external power utilized as operational power of the internal device 1316. For example, the electronic device 1320 may establish a power supply path so as to directly supply external power to the internal device 1338, instead of supplying the external power to a charging unit 1334.

In operation 1509, the electronic device 1320 may supply at least a part of operating power as charging power. For example, the electronic device 1320 may perform processing such that at least one internal device (e.g., application processor) 1338 is operated by the power of the first voltage supplied from the external power supply 1300. Also, the electronic device 1320 may supply, to the battery 1336, power remaining after excluding power required for operating the at least one internal device 1338 from the supplied external power.

In operation 1511, the electronic device 1320 may determine whether the external power supply 1300 is disconnected. For example, the disconnection may mean interruption of the reception of power supplied from the external power supply 1300.

When the connection with the external power supply 1300 is not disconnected, the electronic device 1320 may determine whether a power change event is detected in operation 1513. For example, the power change event may include situations where the voltage of the internal battery 1336 is higher than the voltage of the external battery 1312.

When the power change event is not detected, the electronic device 1320 may receive the power of the first voltage from the external power supply 1300.

When the power change event is detected, the electronic device 1320 may transmit a power change request in operation 1515. Accordingly, the electronic device 1320 may receive the power of the second voltage from the external power supply 1300.

According to various embodiments of the present disclosure, an electronic device may include: a housing; a battery included in the housing: at least one internal device included in the housing; a switch configured to supply power supplied from an external power supply to the at least one interval device; and a controller configured to control the switch, wherein the controller is configured to receive power of a first voltage from the external power supply so as to use the power as operating power of the internal device in response to connecting to the external power supply, and to supply at least a part of the operating power as battery charging power. For example, the power of the first voltage is power within a range of power that does not need a stepdown operation when the power is provided to the internal device.

According to an embodiment, the electronic device may further include a first charging circuit included in the housing, and the controller is configured to control the first charging circuit to operate in a bypass mode such that at least a part of the operating power is supplied to the battery when it is determined that a battery voltage of the external power supply is higher than a voltage of the battery. According to an embodiment, the controller is configured to display information indicating that the bypass mode is executed, and to operate a second charging circuit in a boost mode based on an input for interrupting the execution of the bypass mode.

According to an embodiment, the electronic device may further include a first charging circuit included in the housing, and when it is determined that a voltage of the battery is higher than a battery voltage of the external power supply, the controller is configured to control the first charging circuit to operate in a boost mode such that at least a part of the operating power is supplied to the battery.

According to an embodiment, the electronic device may further include a second charging circuit included in the housing, and when a current within a reference range is supplied to the battery, the controller is configured to control the second charging circuit to operate in a bypass mode such that at least a part of the operating power is supplied to the battery.

According to an embodiment, the electronic device may further include a second charging circuit included in the housing, and when a current beyond a reference range is supplied to the battery, the controller is configured to control the second charging circuit to operate in a buck mode such that at least a part of the operating power is supplied to the battery.

According to an embodiment, the electronic device may further include a communication unit included in the housing, and the controller is configured to provide, to the external power supply, information associated with a voltage of charging power supported by the electronic device.

According to an embodiment, when it is determined that a voltage of the battery is higher than a battery voltage of the external power supply, the controller is configured to receive power of a second voltage which is higher than the first voltage from the external power supply, so as to supply the power of the second voltage to the battery.

According to an embodiment, the controller is configured to perform an overvoltage protection function or an overcurrent protection function using the switch.

According to various embodiments, an operation method of an electronic device may include: receiving power of a first voltage from the external power supply so as to supply the power as operating power of an internal device in response to connecting to the external power supply; and supplying at least a part of the operating power as battery charging power. According to an embodiment, the power of the first voltage is power within a range of power that does not need a stepdown operation when the power is provided to the internal device.

According to an embodiment, the operation of supplying at least a part of the operating power as the battery charging power may include: when it is determined that a battery voltage of the external power supply is higher than a battery voltage of the electronic device, supplying the power of the first voltage from the external power supply to the battery.

According to an embodiment, the operation of supplying at least a part of the operating power as battery charging power may include: displaying information indicating that the power of the first voltage is supplied to the battery; and stepping up power supplied from the external power supply to a second voltage based on an input for interrupting supply of the power of the first voltage.

According to an embodiment, the operation of supplying at least a part of the operating power as battery charging power may include: when it is determined that a battery voltage of the electronic device is higher than a battery voltage of the external power supply, stepping up the power of the first voltage from the external power supply to power of a second voltage, and supplying the power of the second voltage to the battery.

According to an embodiment, the operation of supplying at least a part of the operating power as the battery charging power may include: when it is determined that a current within a reference range is supplied to the battery, supplying power supplied from the external power supply to the battery.

According to an embodiment, the operation of supplying at least a part of the operating power as the battery charging power may include: when a current beyond a reference range is supplied to the battery, stepping down power supplied from the external power supply to a predetermined level and supplying the power to the battery.

According to an embodiment, the method may further include: providing, to the external power supply, information associated with a voltage of charging power supported by the electronic device.

According to an embodiment, the operation of supplying at least a part of the operating power as the battery charging power may include: when it is determined that a battery voltage of the electronic device is higher than a battery voltage of the external power supply, receiving power of a second voltage which is higher than the power of the first voltage, from the external power supply, and supplying the power of the second voltage to the battery.

According to an embodiment, the operation of supplying at least a part of the operating power as the battery charging power may include: when an overvoltage or overcurrent is detected from the internal device or the battery, shutting off supply of power of the external power supply.

According to various embodiments, an external power supply, including: a battery configured to output power of a first voltage; a power converting unit configured to step up a voltage of the battery to a second voltage; a communication unit configured to communicate with an electronic device; and a controller configured to receive information associated with a voltage of charging power supported by the electronic device, and to supply the power of the first voltage or the power of the second voltage to the electronic device based on the received information.

According to an embodiment, the external power supply may include at least one of an external battery and an electronic device providing an external battery function.

The embodiments disclosed herein are proposed to help with description and comprehension of disclosed technical contents, and do not limit the scope of various embodiments of the present disclosure. Therefore, the scope of the various embodiments of the present disclosure should be construed as including all modifications or various other embodiments based on the spirit and scope of the various embodiments of the present disclosure.

What is claimed is:

1. An electronic device, comprising:
a housing;
a battery disposed in the housing:
a charging unit disposed in the housing;
at least one internal device disposed in the housing; and
a controller configured to supply power of a first voltage which is not stepped up by an external power supply, or power of a second voltage which is stepped up by the external power supply to the at least one internal device,
wherein the controller is configured to:
if the power supplied by the external power supply corresponds to the first voltage, establish a first power supply path from the external power supply to the at least one internal device to supply the power of the first voltage to the at least one internal device without step-down, and
if the power supplied by the external power supply corresponds to the second voltage, establish a second power supply path from the external power supply to the charging unit to supply the power of the second voltage to the charging unit,
wherein the charging unit is configured to step down the power of the second voltage to the first voltage to supply power to the at least one internal device.

2. The electronic device of claim 1, wherein the controller is configured to:
when the first power supply path is established, transmit at least a part of the power of the first voltage to the battery as a charging power.

3. The electronic device of claim 2, wherein the controller is configured to:
when the charging power is transmitted, determine a charging type of the battery,
in response to determining a first charging type, transmit the charging power of the first voltage to the battery, and
in response to determining a second charging type, transmit the charging power of the second voltage which is stepped up.

4. The electronic device of claim 2, wherein the controller is configured to:
during the charging power is transmitted,
when a current within a reference range is transmitted to the battery, maintain transmission of the charging power of the first voltage.

5. The electronic device of claim 2, wherein the controller is configured to: while at least the part of the charging power is transmitted,
when a current exceeding a reference range is transmitted to the battery, step down charging power of the second voltage to a predetermined level and supply the stepped-down charging power to the battery.

6. The electronic device of claim 3, wherein the controller is configured to:
determine the charging type of the battery based on a comparison of a voltage of another battery of the external power supply with a voltage of the battery disposed in the housing.

7. The electronic device of claim 2, wherein the controller is configured to:
in response to transmitting the charging power, display a screen allowing selection of a charging type.

8. The electronic device of claim 1, wherein the controller is configured to:
provide first voltage level information associated with a voltage of a charging power supplied by the electronic device, to the external power supply, and
receive power of the first voltage or second voltage selected by the external power supply based on the first voltage level information.

9. The electronic device of claim 1, wherein the controller is configured to:
receive second voltage level information associated with a voltage of a charging power supplied by the external power supply, from the external power supply, and
request power of the first voltage or second voltage as selected based on the second voltage level information.

10. A method in an electronic device, comprising:
in response to detecting connection with an external power supply, receiving power of a first voltage which is not stepped up by an external power supply or power of a second voltage which is stepped up by the external power supply;
if the power supplied by the external power supply corresponds to the first voltage, establishing a first power supply path from the external power supply to at least one internal device of the electronic device to supply the power of the first voltage to the at least one internal device without step-down; and
if the power supplied by the external power supply corresponds to the second voltage, establishing a second power supply path from the external power supply to a charging unit of the electronic device to supply the power of the second voltage to the charging unit,
wherein the charging unit is configured to step down the power of the second voltage to the first voltage to supply power to the at least one internal device.

11. The method of claim 10, further comprising:
when the first power supply path is established, transmitting at least a part of the power of the first voltage to a battery as a charging power.

12. The method of claim 11, further comprising:
when the charging power is transmitted, determining a charging type of the battery,
in response to determining the charging type of the battery is a first charging type, transmitting the charging power of the first voltage to the battery, and
in response to determining the charging type of the battery is a second charging type, transmitting the charging power of the second voltage which is stepped up.

13. The method of claim 12, wherein while at least the part of the charging power is transmitted:
when a current within a reference range is transmitted to the battery, maintaining transmission of the charging power of the first voltage.

14. The method of claim 12, wherein while at least the part of the charging power is transmitted:
when a current exceeding a reference range is transmitted to the battery, stepping down the charging power of the second voltage to a predetermined level, and supplying the stepped-down charging power to the battery.

15. The method of claim 12, wherein the charging type of the battery is determined based on a comparison of a voltage of another battery of the external power supply with a voltage of the battery disposed in a housing.

16. The method of claim 10, further comprising:
in response to transmitting a charging power, displaying a screen allowing selection of a charging type.

17. The method of claim 10, further comprising:
providing first voltage level information associated with a voltage of charging power supplied by the electronic device, to the external power supply, and
receiving power of the first voltage or second voltage selected by the external power supply based on the first voltage level information.

18. The method of claim 10, further comprising:
receiving a second voltage level information associated with a voltage of charging power supplied by the external power supply, from the external power supply, and
requesting the power of the first voltage or the second voltage as selected based on the second voltage level information.

19. An external power supply, comprising:
a battery configured to output power of a first voltage;
a power converter configured to step up a voltage of the battery to a second voltage;
a communication unit configured to communicate with an electronic device; and
a controller configured to:
receive information associated with a voltage of a charging power supplied by the electronic device
in response to determining that the charging power is supplied at the first voltage by the electronic device, transmit the charging power of the first voltage to the electronic device so that the charging power of the first voltage is supplied to at least one internal device of the electronic device without a step-down operation, and
in response to determining that the charging power is supplied at the second voltage by the electronic device, transmit the charging power of the second voltage to the electronic device so that the charging power of the second voltage is supplied to at least one internal device of the electronic device through the step-down operation.

20. The external power supply of claim 19, further comprising at least one of an external battery, and an electronic device providing an external battery function.

* * * * *